United States Patent
Huang et al.

(10) Patent No.: US 8,284,291 B2
(45) Date of Patent: Oct. 9, 2012

(54) PHOTOGRAPHING OPTICAL LENS ASSEMBLY

(75) Inventors: Hsin-Hsuan Huang, Taichung (TW);
Tsung-Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 80 days.

(21) Appl. No.: 13/050,962

(22) Filed: Mar. 18, 2011

(65) Prior Publication Data

US 2012/0105704 A1    May 3, 2012

(30) Foreign Application Priority Data

Nov. 1, 2010   (TW) ................ 99137506 A

(51) Int. Cl.
*H04N 5/225* (2006.01)
*G02B 3/02* (2006.01)

(52) U.S. Cl. ....................... 348/340; 359/714

(58) Field of Classification Search ............... 348/335, 348/340; 359/714, 763
See application file for complete search history.

(56) References Cited

U.S. PATENT DOCUMENTS

| | | | |
|---|---|---|---|
| 7,965,454 B2 | 6/2011 | Tanaka | |
| 8,179,614 B1 * | 5/2012 | Tsai | 359/714 |
| 8,179,615 B1 * | 5/2012 | Tang et al. | 359/714 |
| 2010/0214467 A1 | 8/2010 | Ohtsu | |
| 2010/0220229 A1 | 9/2010 | Sano | |

FOREIGN PATENT DOCUMENTS

| | | |
|---|---|---|
| CN | 201440183 U | 4/2010 |
| CN | 101710207 A | 5/2010 |
| CN | 201508432 U | 6/2010 |

* cited by examiner

*Primary Examiner* — David N Spector
(74) *Attorney, Agent, or Firm* — CKC & Partners Co., Ltd.

(57) ABSTRACT

A photographing optical lens assembly includes, in order from an object side to an image side, a first lens element with positive refractive power having a convex object-side surface, a second lens element with negative refractive, a third lens element, a fourth lens element, and a fifth lens element having a concave image-side surface and having at least one inflecting point.

26 Claims, 18 Drawing Sheets

PHOTOGRAPHING OPTICAL LENS ASSEMBLY

RELATED APPLICATIONS

The application claims priority to Taiwan Application Serial Number 099137506, filed Nov. 1, 2010, which is herein incorporated by reference.

BACKGROUND

1. Technical Field

The present invention relates to a photographing optical lens assembly. More particularly, the present invention relates to a compact photographing optical lens assembly applicable to electronic products.

2. Description of Related Art

In recent years, with the popularity of mobile products with camera functionalities, the demand for compact photographing lenses is increasing, and the sensor of a conventional photographing camera is none other than CCD (Charge Coupled Device) or CMOS (Complementary Metal-Oxide Semiconductor Sensor). Furthermore, as advanced semiconductor manufacturing technology has allowed the pixel size of sensors to be reduced and compact photographing lenses have gradually evolved toward higher megapixels, there is an increasing demand for compact photographing lenses featuring better image quality.

A conventional compact photographing lens assembly on a portable electronic product mainly adopts a four-element lens structure. Due to the popularity of high specification mobile products, such as Smart Phones and PDAs (Personal Digital Assistants), the requirements of pixels and image quality of the compact photographing lens assembly increase rapidly. However, the conventional four-piece lens structure cannot satisfy the requirements of the compact photographing lens assembly. Furthermore, the trend of modern electronics gradually moves toward high performance and compact size. Therefore, a need exists in the art for providing a photographing lens assembly having excellent imaging quality without a long total track length for portable mobile electronics.

SUMMARY

The present invention provides a photographing optical lens assembly including, in order from an object side to an image side: a first lens element, a second lens element, a third lens element, a fourth lens element and a fifth lens element. The first lens element with positive refractive power has a convex object-side surface. The second lens element is with negative refractive power. The fifth lens element has a concave image-side surface, and is made of plastic material, wherein the fifth lens has at least one inflection point on the object-side surface and the image-side surface thereof. A focal length of the photographing optical lens assembly is f, and a focal length of the first lens element is f1. The photographing optical lens assembly further includes an aperture stop and an image sensor, wherein a distance on the optical axis between the aperture stop and the image side is SL, a distance on the optical axis between the object-side surface of the first lens element and the image side is TTL, when the incident angle θ1 of the light is 36 degrees and the light passes through the center of the aperture stop, the vertical distance from the optical axis to the intersection point of the light and the image-side surface of the fifth lens element is Yc1, the image sensor is located on the image plane, a half of a diagonal length of an effective pixel area of the image sensor is ImgH. f, f1, SL, TTL, Yc1 and ImgH satisfy the following relationships:

$0.7 < f/f1 < 2.0;$ $0.7 < SL/TTL < 1.2;$ and $0.3 < Yc1/ImgH < 0.9.$

According to another aspect of the present invention, a photographing optical lens assembly includes, in order from an object side to an image side: a first lens element, a second lens element, a third lens element, a fourth lens element and a fifth lens element. The first lens element with positive refractive power has a convex to object-side surface. The second lens element is with negative refractive power. The fourth lens element is with positive refractive power, wherein at least one surface of the fourth lens element is aspheric. The fifth lens element with negative refractive power has a concave image-side surface, wherein at least one surface of the fifth lens element is aspheric. A radius of curvature of the object-side surface of the fifth lens element is R9, and a radius of curvature of the image-side surface of the fifth lens element is R10. The photographing optical lens assembly further includes an aperture stop and an image sensor, wherein a distance on the optical axis between the aperture stop and the image plane is SL, a distance on the optical axis between the object-side surface of the first lens element and the image plane is TTL, when the incident angle θ1 of the light is 36 degrees and the light passes through the center of the aperture stop, the vertical distance from the optical axis to the intersection point of the light and the image-side surface of the fifth lens element is Yc1, the image sensor is located on the image plane, a half of a diagonal length of an effective pixel area of the image sensor is ImgH. R9, R10, SL, TTL, Yc1 and ImgH satisfy the following relationships:

$-5 < R10/R9 < 5;$ $0.7 < SL/TTL < 1.2;$ and $0.3 < Yc1/ImgH < 0.9.$

According to further another aspect of the present invention, a photographing optical lens assembly includes, in order from an object side to an image side: a first lens element, a second lens element, a third lens element, a fourth lens element and a fifth lens element. The first lens element with positive refractive power has a convex object-side surface. The fourth lens element with positive refractive power has a concave object-side surface and a convex image-side surface, wherein at least one surface of the fourth lens element is aspheric. The fifth lens element with negative to refractive power has a concave image-side surface, wherein the fifth lens element has at least one inflection point on at least one of the object-side surface and the image-side surface thereof. A maximal field of view of the photographing optical lens assembly is FOV; a radius of curvature of the object-side surface of the fifth lens element is R9, and a radius of curvature of the image-side surface of the fifth lens element is R10. FOV, R9 and R10 satisfy the following relationships:

$FOV > 72;$ and $0 < (R9+R10)/(R9-R10) < 1.7.$

DETAILED DESCRIPTION

Figure 1:
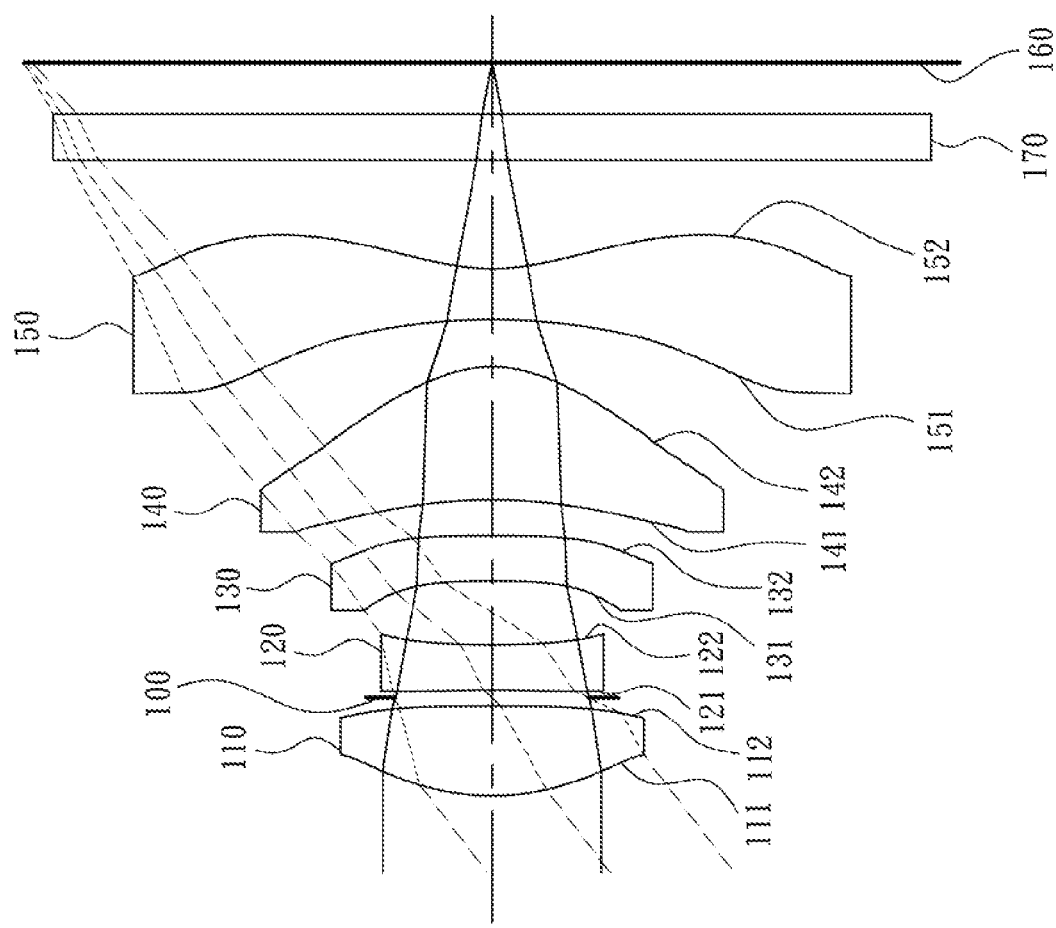
FIG. 1 is a schematic view of a photographing optical lens assembly according to the first embodiment.

A photographing optical lens assembly includes, in order from an object side to an image side: a first lens element, a second lens element, a third lens element, a fourth lens element and a fifth lens element. The photographing optical lens assembly further includes an image sensor located on the image plane.

The first lens element with positive refractive power provides partial positive refractive power for reducing the total track length of the photographing optical lens assembly. The first lens element can have a convex object-side surface and a convex image-side surface or a convex object-side surface and a concave image-side surface. When the first lens element has a convex object-side surface and a convex image-side surface, the refractive power thereof can be effectively enhanced, thus further reducing the total track length of the photographing optical lens assembly. When the first lens element has a convex object-side surface and a concave image-side surface, the astigmatism of the photographing optical lens assembly can be corrected.

The second lens element with negative refractive power can effectively correct the aberration generated from the first lens element and meanwhile advantageously correct the chromatic aberration within the optical system.

When the fourth lens element has positive refractive power, the refractive power of the fourth lens element can reduce the photosensitivity of the photographing optical lens assembly by providing a partial distribution of the system refractive power. The fourth lens element can have a concave object-side surface and a convex object-side surface, and the object-side surface and the image-side surface of the fourth lens element can be aspheric. Thus, the astigmatism of the photographing optical lens assembly can be corrected.

The fifth lens element is located between the fourth lens element and the image plane. The fifth lens element is made of plastic material and has a concave image-side surface. The object-side surface and the image-side surface of the fifth lens element can be aspheric. When the fifth lens element has negative refractive power, the principal point of the photographing optical lens assembly can be positioned away from the image plane, and the total track length of the photographing optical lens assembly can be reduced so as to maintain the compact size of the photographing optical lens assembly. Furthermore, the fifth lens element has at least one inflection point formed on at least one of the object-side surface and image-side surface thereof. Therefore, the incident angle of the off-axis field of light on the image sensor can be efficiently restrained and the aberration of the off-axis field can be corrected.

A focal length of the photographing optical lens assembly is f; a focal length of the first lens element is f1, and they satisfy the following relationship:

$$0.7 < f/f1 < 2.0.$$

When the above relation is satisfied, the refractive power of the first lens element can maintain a shorter total track length of the photographing optical lens assembly. At the same time, the high-order spherical aberration can be corrected.

f and f1 can further satisfy the following relationship:

$$1.0 < f/f1 < 1.8.$$

The photographing optical lens assembly further includes an aperture stop. A distance on the optical axis between the aperture stop and the image plane is SL; a distance on the optical axis between the object-side surface of the first lens element and the image plane is TTL, and they satisfy the following relationship:

$$0.7 < SL/TTL < 1.2.$$

When the SL/TTL<0.7, the angle of incidence on the image sensor would be too large, which will cause poor photographic performance of the image sensor as well as too much chromatic aberration within the photographing optical lens assembly. When the SL/TTL>1.20, the total track length of the photographing optical lens assembly would be too long. Therefore, when SL/TTL satisfies the above relationship, the photographing optical lens assembly has the telecentric characteristic, and a desirable total track length of the photographing optical lens assembly can be maintained.

When the incident angle $\theta 1$ of the light is 36 degrees and the light passes through the center of the aperture stop, the vertical distance from the optical axis to the intersection point of the light and the image-side surface of the fifth lens element is Yc1, and a half of a diagonal length of an effective pixel area of the image sensor is ImgH. They satisfy the following relationship:

$$0.3 < Yc1/ImgH < 0.9.$$

Therefore, the photographing optical lens assembly can have sufficient field of view, and the incident angle of the off-axis field of light on the image sensor can be effectively restrained, and the aberration of the off-axis field can be corrected.

The focal length of the photographing optical lens assembly is f, the focal length of the first lens element is f1, a focal length of the fourth lens element is f4, and they satisfy the following relationship:

$$0.0 < f/f4 - f/f1 < 1.5.$$

When the above relation is satisfied, the distribution of the refractive power of the fourth lens element and the first lens element are balanced for reducing the sensitivity of the photographing optical lens assembly.

The radius of curvature of the object-side surface of the fifth lens element is R9, a radius of curvature of the image-side surface of the fifth lens element is R10, and they satisfy the following relationship:

$$-5 < R10/R9 < 5.$$

When the above relation is satisfied, the astigmatism and the distortion of the photographing optical lens assembly can be corrected. Furthermore, the angle of incidence on the image sensor can be reduced and the photosensitivity of the image sensor can be increased, so that the shading occurrences of the photographing optical lens assembly can be reduced.

R9 and R10 can further satisfy the following relationship:

$$-1.2 < R10/R9 < 0.$$

R9 and R10 can yet satisfy the following relationship:

$$-1 < R4/R3 < 0.$$

The focal length of the photographing optical lens assembly is f, a focal length of the fifth lens element is f5, and they satisfy the following relationship:

$$-3.2 < f/f5 < -1.6.$$

When the above relation is satisfied, the aberration of the photographing optical lens assembly can be balanced and corrected for retaining superb image quality.

f and f5 can further satisfy the following relationship:

$$-2.8 < f/f5 < -1.6.$$

A radius of curvature of the object-side surface of the first lens element is R1, a radius of curvature of the image-side surface of the first lens element is R2, and they satisfy the following relationship:

$$|R1/R2| < 0.3.$$

When the above relation is satisfied, the spherical aberration can be corrected, and the total track length of the photographing optical lens assembly can be reduced by the first lens element.

The Abbe number of the second lens element is V2, the Abbe number of the third lens element is V3, and they satisfy the following relationship:

$$|V2-V3| < 10.$$

When the above relation is satisfied, the ability for correcting the chromatic aberration of the photographing optical lens assembly can be increased.

The focal length of the photographing optical lens assembly is f, the focal length of the fourth lens element is f4, and they satisfy the following relationship:

$$1.3 < f/f4 < 2.5.$$

When the above relation is satisfied, the distribution of the refractive power of the fourth lens element can be controlled, so that the aberration of the photographing optical lens assembly can be corrected and the photosensitivity of the photographing optical lens assembly can be reduced.

When the incident angle $\theta_2$ of the light is 37 degrees and the light passes through the center of the aperture stop, the vertical distance from the optical axis to the intersection point of the light and the image-side surface of the fifth lens element is Yc2, and the half of a diagonal length of an effective pixel area of the image sensor is ImgH, and they satisfy the following relationship:

$$0.5 < Yc2/ImgH < 0.9.$$

The Abbe number of the first lens element is V1, the Abbe number of the second lens element is V2, and they satisfy the following relationship:

$$28 < V1-V2 < 45.$$

When the above relation is satisfied, the chromatic aberration of the photographing optical lens assembly can be corrected.

V1 and V2 can further satisfy the following relationship:

$$28 < V1-V2 < 42.$$

A radius of curvature of the object-side surface of the fifth lens element is R9, a radius of curvature of the image-side surface of the fifth lens element is R10, and they satisfy the following relationship:

$$0 < (R9+R10)/(R9-R10) < 1.7.$$

When the above relation is satisfied, the principal point of the photographing optical lens assembly can be positioned away from the image plane, and the total track length of the photographing optical lens assembly can be reduced so as to maintain the compact size of the photographing optical lens assembly.

R9 and R10 can further satisfy the following relationship:

$$0.0 < (R9+R10)/(R9-R10) < 1.0.$$

A radius of curvature of the object-side surface of the second lens element is R3, the radius of curvature of the image-side surface of the second lens element is R4, and they satisfy the following relationship:

$$-1 < R4/R3 < 0.$$

When the above relation is satisfied, the aberration of the first lens element can be corrected. Moreover, the refractive power of the second lens element can be balanced to avoid too much higher order astigmatism.

The distance on the optical axis between the object-side surface of the first lens element and the image plane is TTL, the half of a diagonal length of an effective pixel area of the image sensor is ImgH, and they satisfy the following relationship:

$$TTL/ImgH < 1.75.$$

When the above relation is satisfied, the compact size of the photographing optical lens assembly can be maintained for its usage in portable electronics.

A maximal field of view of the photographing optical lens assembly is FOV which satisfies the following relationship:

$$FOV > 72.$$

Therefore, the larger field of view can be provided for wide-range imaging.

According to the above description of the present invention, the following specified embodiments are provided for further explanation.

Figure 2:
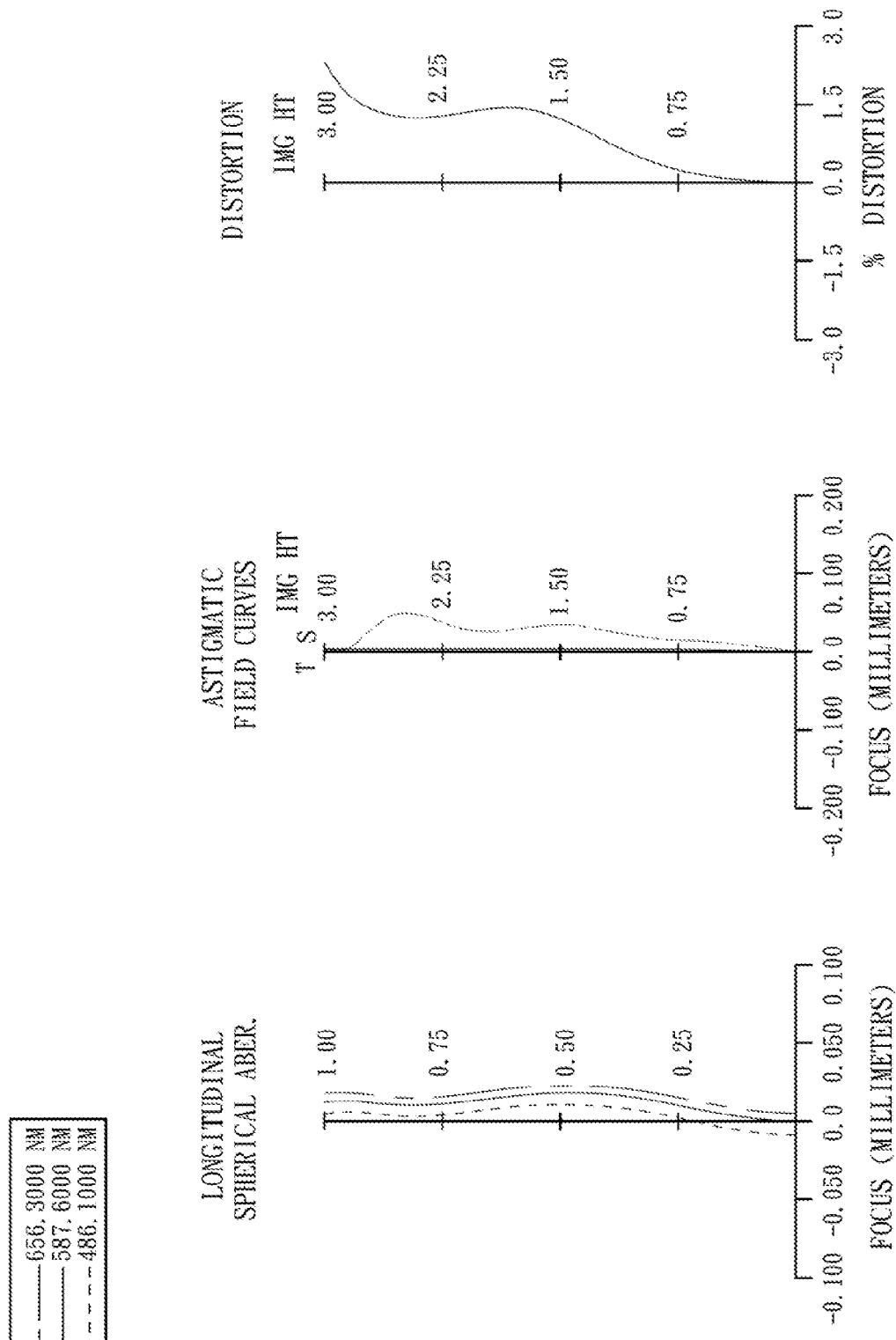
FIG. 2 shows spherical aberration curves, astigmatic field curves and a distortion curve of the photographing optical lens assembly according to the first embodiment.

FIG. 1 is a schematic view of a photographing optical lens assembly according to the first embodiment. FIG. 2 shows spherical aberration curves, astigmatic field curves and distortion curve of the photographing optical lens assembly according to the first embodiment. In FIG. 1, the photographing optical lens assembly includes, in order from an object side to an image side: the first lens element 110, an aperture stop 100, the second lens element 120, the third lens element 130, the fourth lens element 140, the fifth lens element 150, an IR (infrared) cut filter 170 and an image plane 160.

The first lens element 110 is made of plastic material. The first lens element 110 with positive refractive power has a convex object-side surface 111 and a convex image-side surface 112. The object-side surface 111 and the image-side surface 112 of the first lens element 110 are aspheric.

The second lens element 120 is made of plastic material. The second lens element 120 with negative refractive power has a concave object-side surface 121 and a concave image-side surface 122. The object-side surface 121 and the image-side surface 122 of the second lens element 120 are aspheric.

The third lens element 130 is made of plastic material. The third lens element 130 with negative refractive power has a concave object-side surface 131 and a convex image-side surface 132. The object-side surface 131 and the image-side surface 132 of the third lens element 130 are aspheric.

The fourth lens element 140 is made of plastic material. The fourth lens element 140 with positive refractive power has a concave object-side surface 141 and a convex image-side surface 142. The object-side surface 141 and the image-side surface 142 of the fourth lens element 140 are aspheric.

The fifth lens element 150 is made of plastic material. The fifth lens element 150 with negative refractive power has a concave object-side surface 151 and a concave image-side surface 152. The object-side surface 151 and the image-side surface 152 of the fifth lens element 150 are aspheric. Furthermore, the fifth lens element 150 has at least one inflection point formed on at least one of the object-side surface 151 and the image-side surface 152 thereof.

The IR cut filter 170 is made of glass and is located between the fifth lens element 150 and the image plane 160 which have no influence on the focal length of the photographing optical lens assembly.

The equation of the aspheric surface profiles of the above lens elements of the first embodiment is expressed as follows:

$$X(Y) = (Y^2/R)/(1 + sqrt(1 - (1+k) \times (Y/R)^2)) + \sum_i (Ai) \times (Y^i)$$

wherein:

X: the height of a point on the aspheric surface spaced at a distance Y from the optical axis relative to the tangential plane at the aspheric surface vertex;

Y: the distance from the point on the curve of the aspheric surface to the optical axis;

k: the conic coefficient; and

Ai: the i-th aspheric coefficient.

In the photographing optical lens assembly according to the first embodiment, f is a focal length of the photographing optical lens assembly, Fno is an f-number of the photographing optical lens assembly, HFOV is half of the maximal field of view, and they satisfy the following relationships:

$f$=3.83 mm;

$F$no=2.70;

and

HFOV=37.6 degrees.

In the photographing optical lens assembly according to the first embodiment, V1 is an Abbe number of the first lens element 110, V2 is an Abbe number of the second lens element 120, V3 is an Abbe number of the third lens element 130, and they satisfy the following relationships:

$V1-V2$=32.5; and $|V2-V3|$=0.0.

In the photographing optical lens assembly according to the first embodiment, R1 is the radius of curvature of the object-side surface 111 of the first lens element 110, R2 is the radius of curvature of the image-side surface 112 of the first lens element 110, R3 is the radius of curvature of the object-side surface 121 of the second lens element 120, R4 is the radius of curvature of the image-side surface 122 of the second lens element 120, R9 is the radius of curvature of the object-side surface 151 of the fifth lens element 150, R10 is the radius of curvature of the image-side surface 152 of the fifth lens element 150; and they satisfy the following relationships:

$|R1/R2|$=0.10;

$R4/R3$=−0.65;

$R10/R9$=−0.36;

and $(R9+R10)/(R9-R10)$=0.47.

In the photographing optical lens assembly according to the first embodiment, f is the focal length of the photographing optical lens assembly, and f1 is the focal length of the first lens element 110, f4 is the focal length of the fourth lens element 140, f5 is the focal length of the fifth lens element 150, and they satisfy the following relationships:

$f/f1$=1.44;

$f/f4$=2.15;

$f/f5$=−2.27;

and $f/f4-f/f1$=0.71.

Figure 3:
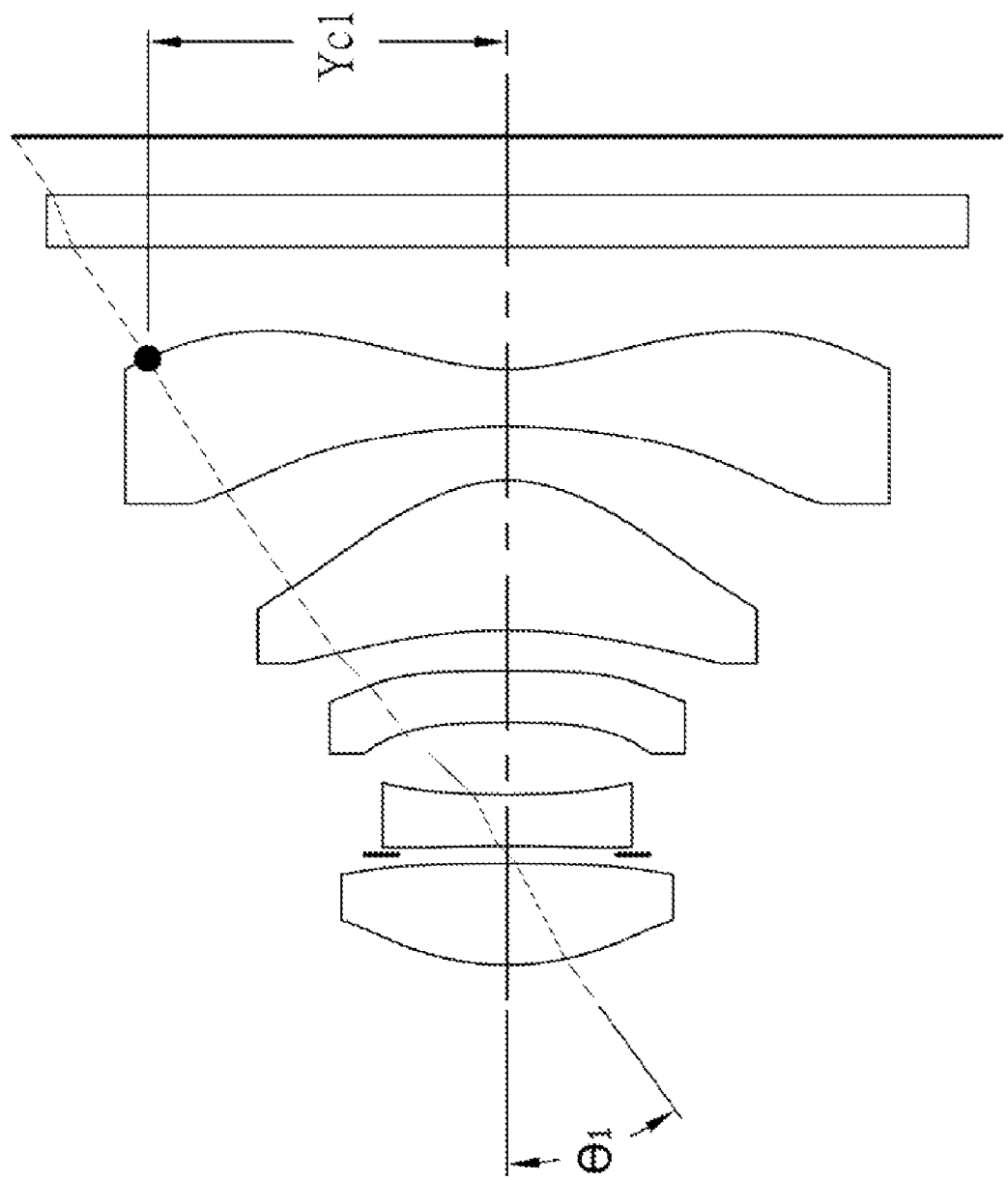
FIG. 3 shows the incident angle $\theta_1$ of the light passing through the photographing optical lens assembly according to the first embodiment of FIG. 1.
Figure 4:
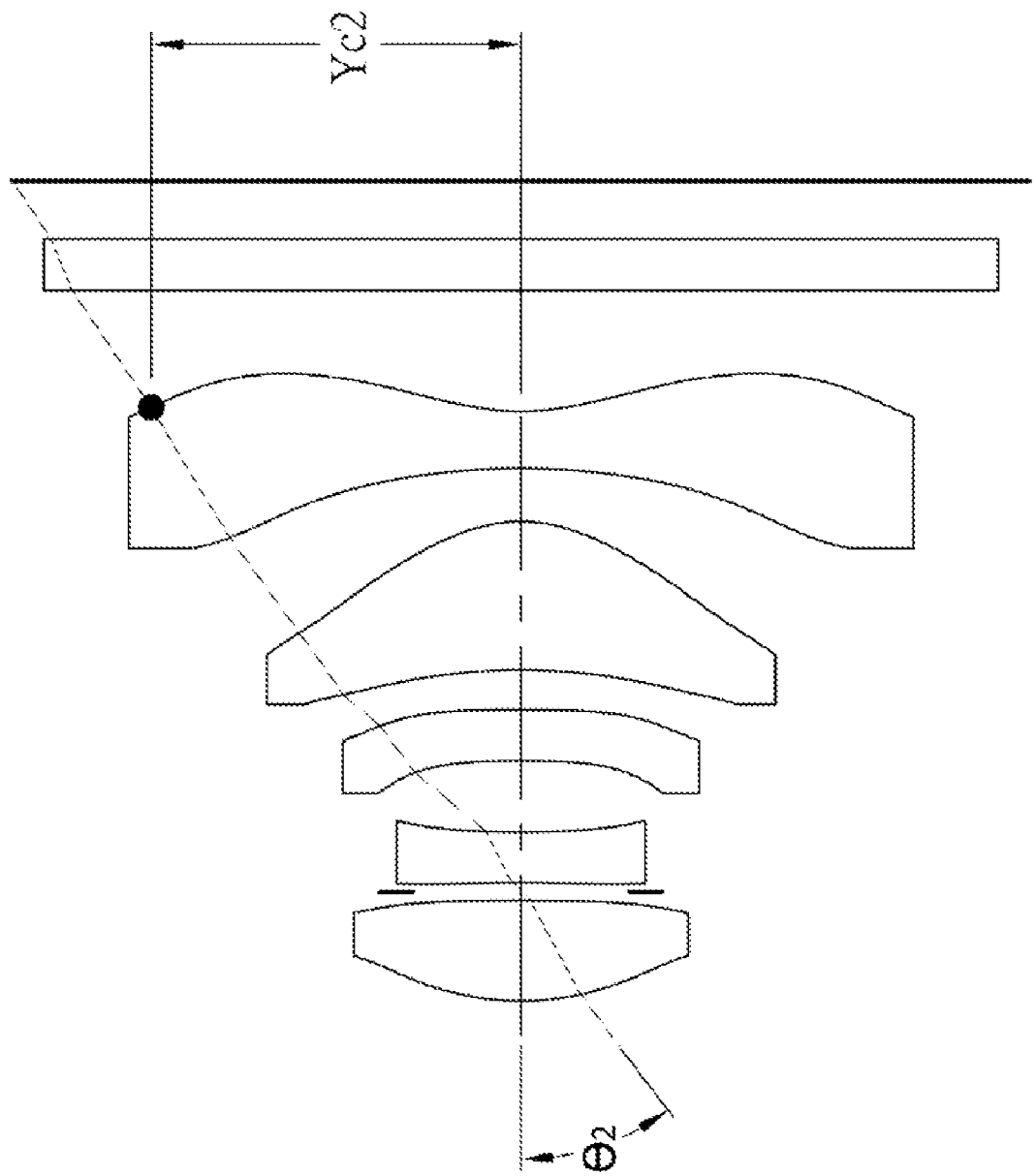
FIG. 4 shows the incident angle $\theta_2$ of the light passing through the photographing optical lens assembly according to the first embodiment of FIG. 1.

Referring to FIG. 3 and FIG. 4, FIG. 3 shows the incident angle $\theta_1$ of the light passing through the photographing optical lens assembly according to the first embodiment of FIG. 1, and FIG. 4 shows the incident angle $\theta_2$ of the light passing through the photographing optical lens assembly according to the first embodiment of FIG. 1. When the incident angle θ1 of the light is 36 degrees and the light passes through the center of the aperture stop 100, the vertical distance from the optical axis to the intersection point of the light and the image-side surface 152 of the fifth lens element 150 is Yc1. When the incident angle θ2 of the light is 37 degrees and the light passes through the center of the aperture stop 100, the vertical distance from the optical axis to the intersection point of the light and the image-side surface 152 of the fifth lens element 150 is Yc2. According to the first embodiment, the photographing optical lens assembly further includes an image sensor. The image sensor is located on the image plane 160. A half of a diagonal length of an effective pixel area of the image sensor is ImgH. Yc1, Yc2 and ImgH satisfy the following relationships:

$Yc1/ImgH=0.70;$ and $Yc2/ImgH=0.73.$

In the photographing optical lens assembly according to the first embodiment, SL is the distance on the optical axis between the aperture stop 100 and the image plane 160, and TTL is the distance on the optical axis between the object-side surface 111 of the first lens element 110 and the image plane 160, and ImgH is the half of a diagonal length of an effective pixel area of the image sensor, and they satisfy the following relationships:

$SL/TTL=0.86;$ and $TTL/ImgH=1.54.$

The detailed optical data of the first embodiment is shown in Table 1, and the aspheric surface data is shown in Table 2 as follows.

TABLE 1

(Embodiment I)
f = 3.83 mm, Fno = 2.70, HFOV = 37.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.56988 (ASP) | 0.583 | Plastic | 1.544 | 55.9 | 2.66 |
| 2 | | −15.79413 (ASP) | 0.050 | | | | |
| 3 | Ape. Stop | Plano | 0.050 | | | | |
| 4 | Lens 2 | −9.04694 (ASP) | 0.290 | Plastic | 1.632 | 23.4 | −5.57 |
| 5 | | 5.84243 (ASP) | 0.416 | | | | |
| 6 | Lens 3 | −6.80807 (ASP) | 0.290 | Plastic | 1.632 | 23.4 | −17.05 |
| 7 | | −18.79578 (ASP) | 0.231 | | | | |
| 8 | Lens 4 | −3.42032 (ASP) | 0.857 | Plastic | 1.544 | 55.9 | 1.78 |
| 9 | | −0.81995 (ASP) | 0.311 | | | | |
| 10 | Lens 5 | −3.46523 (ASP) | 0.322 | Plastic | 1.530 | 55.8 | −1.69 |
| 11 | | 1.24310 (ASP) | 0.700 | | | | |
| 12 | IR-filter | Plano | 0.300 | Glass | 1.517 | 64.2 | — |
| 13 | | Plano | 0.332 | | | | |
| 14 | Image | Plano | — | | | | |

Note:
Reference wavelength (d-line) is 587.6 nm

TABLE 2

| Aspheric Coefficients | | | | | |
|---|---|---|---|---|---|
| Surface # | 1 | 2 | 4 | 5 | 6 |
| k = | −8.18635E+00 | 2.16287E+02 | −2.01518E+02 | 1.79734E+01 | −1.15606E+02 |
| A4 = | 2.34294E−01 | −1.85139E−02 | 4.49397E−02 | 6.66974E−02 | −2.81509E−01 |
| A6 = | −2.47004E−01 | 2.07360E−02 | 2.66174E−02 | −1.47686E−02 | −1.98902E−01 |
| A8 = | 1.96471E−01 | −1.97755E−01 | 2.01808E−01 | 1.73527E−01 | 3.48528E−01 |
| A10 = | −1.58867E−01 | 3.55191E−01 | −8.50344E−01 | −3.83229E−01 | −4.34119E−01 |
| A12 = | 4.36537E−02 | −3.24745E−01 | 1.42254E+00 | 4.47389E−01 | 2.87589E−01 |
| A14 = | −1.66221E−02 | 1.07361E−01 | −7.16280E−01 | −1.67673E−01 | |
| Surface # | 7 | 8 | 9 | 10 | 11 |
| k = | 6.35287E+01 | 5.76479E+00 | −3.22407E+00 | −3.68021E+01 | −9.03368E+00 |
| A4 = | −1.39738E−01 | 1.22855E−02 | −1.36028E−01 | −1.73802E−02 | −5.46898E−02 |
| A6 = | −1.51420E−01 | 8.60333E−02 | 1.55162E−01 | −2.68642E−02 | 1.63411E−02 |
| A8 = | 1.80100E−01 | −2.22096E−01 | −1.23219E−01 | 1.19393E−01 | −6.03018E−03 |
| A10 = | −4.07844E−02 | 2.97724E−01 | 6.64329E−02 | −9.08050E−04 | 1.49876E−03 |
| A12 = | 1.02776E−02 | −1.69789E−01 | −1.69766E−02 | −1.89517E−04 | −2.08363E−04 |
| A14 = | | 3.57355E−02 | 1.19490E−03 | 2.59685E−05 | 1.27179E−05 |

In Table 1, the curvature radius, the thickness and the focal length are shown in millimeter (mm). Surface numbers 0-14 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th. All labels for Tables of the remaining embodiments share the same definitions as Table 1 and Table 2 of the first embodiment, and their definitions will not be stated again.

Figure 5:
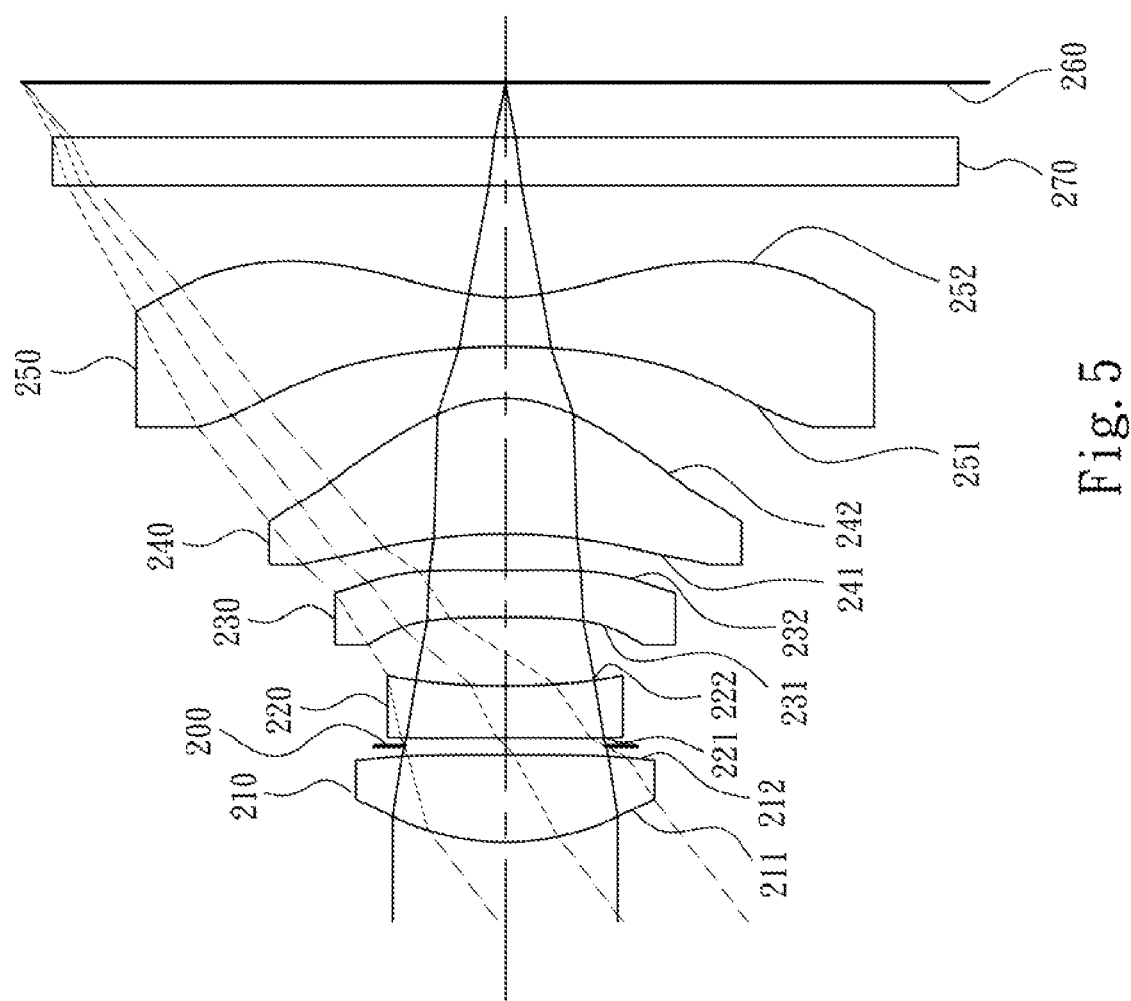
FIG. 5 is a schematic view of a photographing optical lens assembly according to the second embodiment.
Figure 6:
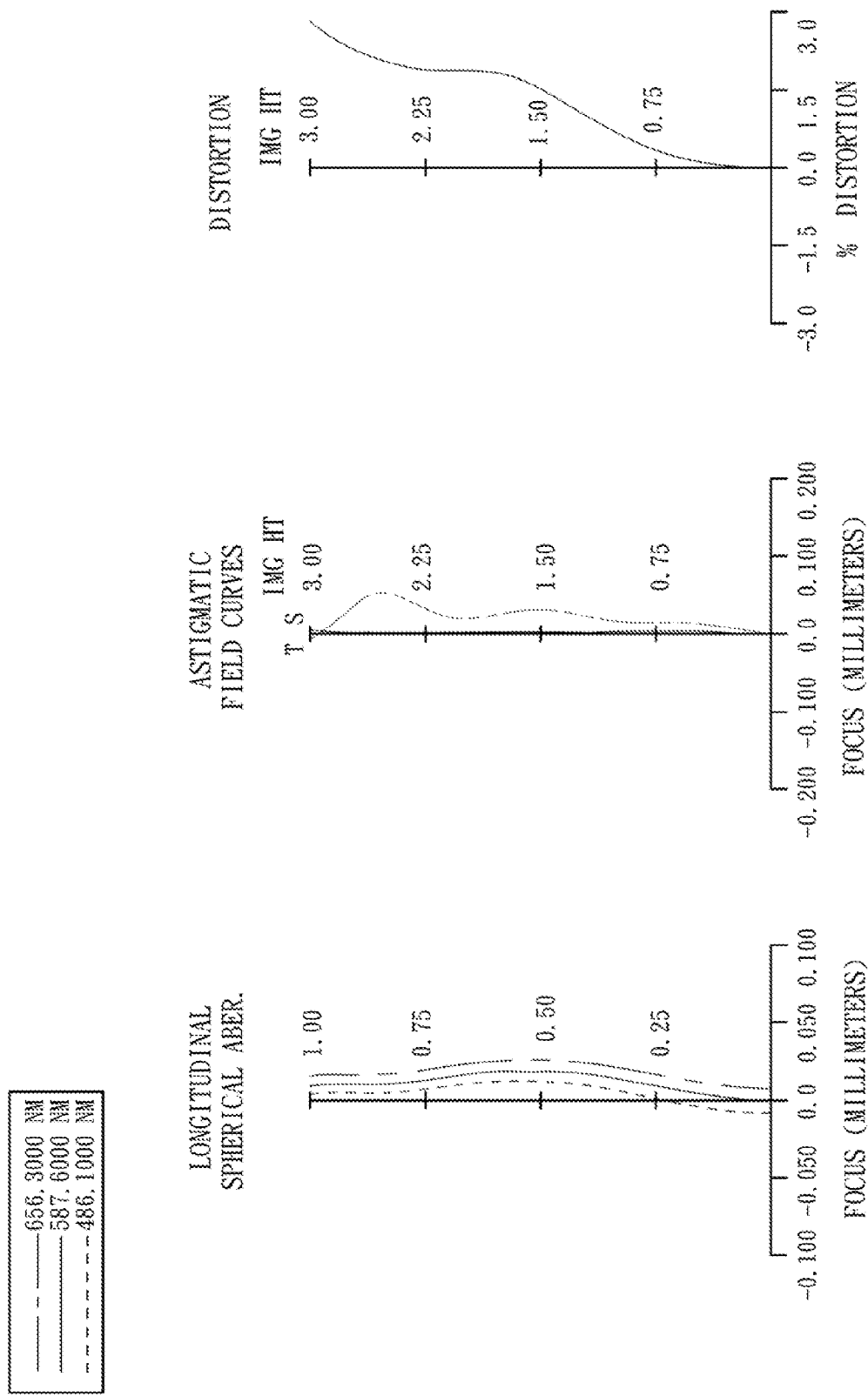
FIG. 6 shows spherical aberration curves, astigmatic field curves and distortion curve of the photographing optical lens assembly according to the second embodiment.

FIG. 5 is a schematic view of a photographing optical lens assembly according to the second embodiment. FIG. 6 shows spherical aberration curves, astigmatic field curves and distortion curve of the photographing optical lens assembly according to the second embodiment. In FIG. 5, the photographing optical lens assembly includes, in order from an object side to an image side: the first lens element 210, an aperture stop 200, the second lens element 220, the third lens element 230, the fourth lens element 240, the fifth lens element 250, an IR (infrared) cut filter 270 and an image plane 260.

The first lens element 210 is made of plastic material. The first lens element 210 with positive refractive power has a convex object-side surface 211 and a convex image-side surface 212. The object-side surface 211 and the image-side surface 212 of the first lens element 210 are aspheric.

The second lens element 220 is made of plastic material. The second lens element 220 with negative refractive power has a concave object-side surface 221 and a concave image-side surface 222. The object-side surface 221 and the image-side surface 222 of the second lens element 220 are aspheric.

The third lens element 230 is made of plastic material. The third lens element 230 with negative refractive power has a concave object-side surface 231 and a concave image-side surface 232. The object-side surface 231 and the image-side surface 232 of the third lens element 230 are aspheric.

The fourth lens element 240 is made of plastic material. The fourth lens element 240 with positive refractive power has a concave object-side surface 241 and a convex image-side surface 242. The object-side surface 241 and the image-side surface 242 of the fourth lens element 240 are aspheric.

The fifth lens element 250 is made of plastic material. The fifth lens element 250 with negative refractive power has a concave object-side surface 251 and a concave image-side surface 252. The object-side surface 251 and the image-side surface 252 of the fifth lens element 250 are aspheric. Furthermore, the fifth lens element 250 has at least one inflection point formed on at least one of the object-side surface 251 or the image-side surface 252 thereof.

The IR cut filter 270 is made of glass and is located between the fifth lens element 250 and the image plane 260 and will not affect the focal length of the photographing optical lens assembly.

The equation of the aspheric surface profiles of the above lens elements of the second embodiment is the same as that of the first embodiment, and will not be stated herein again.

In the photographing optical lens assembly according to the second embodiment, the definitions of f, Fno and HFOV are the same as those stated in the first embodiment with corresponding values for the second embodiment, and they satisfy the following relationships:

$f=3.83$ mm;

$Fno=2.70$;

and $HFOV=37.4$ degrees.

In the photographing optical lens assembly according to the second embodiment, the definitions of all variables for conditions provided in the claims (V1, V2, V3, R1, R2, R3, R4, R9, R10, f1, f4, f5, Yc1, Yc2, SL, TTL, and ImgH) are the same as those stated in the first embodiment with corresponding values for the second embodiment, and they satisfy the following relationships:

$V1-V2=34.4$;

$|V2-V3|=2.0$;

$|R1/R2|=0.02$;

$R4/R3=-0.14$;

$R10/R9=-0.27$;

$(R9+R10)/(R9-R10)=0.57$;

$f/f1=1.30$;

$f/f4=2.14$;

$f/f5=-2.23$;

$f/f4-f/f1=0.84$;

$Yc1/ImgH=0.68$;

$Yc2/ImgH=0.71$;

$SL/TTL=0.87$;

and $TTL/ImgH=1.55$.

The detailed optical data of the second embodiment is shown in Table 3, and the aspheric surface data is shown in Table 4 as follows.

TABLE 3

(Embodiment 2)
f = 3.83 mm, Fno = 2.70, HFOV = 37.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.59040 (ASP) | 0.550 | Plastic | 1.530 | 55.8 | 2.94 |
| 2 | | −64.70619 (ASP) | 0.050 | | | | |
| 3 | Ape. Stop | Plano | 0.050 | | | | |
| 4 | Lens 2 | −36.72539 (ASP) | 0.327 | Plastic | 1.650 | 21.4 | −6.92 |
| 5 | | 5.14244 (ASP) | 0.433 | | | | |
| 6 | Lens 3 | −18.20366 (ASP) | 0.290 | Plastic | 1.632 | 23.4 | −16.62 |
| 7 | | 25.00000 (ASP) | 0.226 | | | | |

TABLE 3-continued (Embodiment 2)
f = 3.83 mm, Fno = 2.70, HFOV = 37.4 deg.

| Surface # | | Curvature Radius | Thickness | Material | Index | Abbe # | Focal length |
|---|---|---|---|---|---|---|---|
| 8 | Lens 4 | −3.45058 (ASP) | 0.849 | Plastic | 1.544 | 55.9 | 1.79 |
| 9 | | −0.82476 (ASP) | 0.328 | | | | |
| 10 | Lens 5 | −4.35094 (ASP) | 0.304 | Plastic | 1.530 | 55.8 | −1.72 |
| 11 | | 1.18327 (ASP) | 0.700 | | | | |
| 12 | IR-filter | Plano | 0.300 | Glass | 1.517 | 64.2 | — |
| 13 | | Plano | 0.346 | | | | |
| 14 | Image | Plano | — | | | | |

Note:
Reference wavelength (d-line) is 587.6 nm

TABLE 4

Aspheric Coefficients

| Surface # | 1 | 2 | 4 | 5 | 6 |
|---|---|---|---|---|---|
| k = | −8.08530E+00 | −1.00000E+00 | −1.00000E+00 | −1.73984E+01 | −1.00000E+00 |
| A4 = | 2.31551E−01 | −2.61050E−02 | 1.67532E−02 | 3.53718E−02 | −2.40149E−01 |
| A6 = | −2.39970E−01 | 2.55204E−02 | 1.15766E−02 | −1.01145E−02 | −1.99867E−01 |
| A8 = | 2.14587E−01 | −1.71468E−01 | 2.47172E−01 | 1.85470E−01 | 3.67263E−01 |
| A10 = | −1.55605E−01 | 3.15179E−01 | −9.37138E−01 | −4.24838E−01 | −4.55426E−01 |
| A12 = | 3.56448E−02 | −3.24695E−01 | 1.42254E+00 | 4.47389E−01 | 2.87614E−01 |
| A14 = | −1.47039E−02 | 1.07361E−01 | −7.16280E−01 | −1.67673E−01 | |

| Surface # | 7 | 8 | 9 | 10 | 11 |
|---|---|---|---|---|---|
| k = | −1.00000E+00 | 5.82685E+00 | −3.24892E+00 | −3.35644E+01 | −8.60656E+00 |
| A4 = | −1.44369E−01 | 1.41429E−02 | −1.49793E−01 | −1.95214E−02 | −5.71619E−02 |
| A6 = | −1.37255E−01 | 8.35062E−02 | 1.61464E−01 | −2.71755E−02 | 1.65150E−02 |
| A8 = | 1.72861E−01 | −2.20014E−01 | −1.21614E−01 | 1.19096E−02 | −5.99493E−03 |
| A10 = | −4.72662E−02 | 2.98883E−01 | 6.63379E−02 | −9.04204E−04 | 1.50130E−03 |
| A12 = | 1.16495E−02 | −1.69863E−01 | −1.71125E−02 | −1.88706E−04 | −2.08631E−04 |
| A14 = | | 3.53840E−02 | 1.14980E−03 | 2.59641E−05 | 1.22771E−05 |

Figure 7:
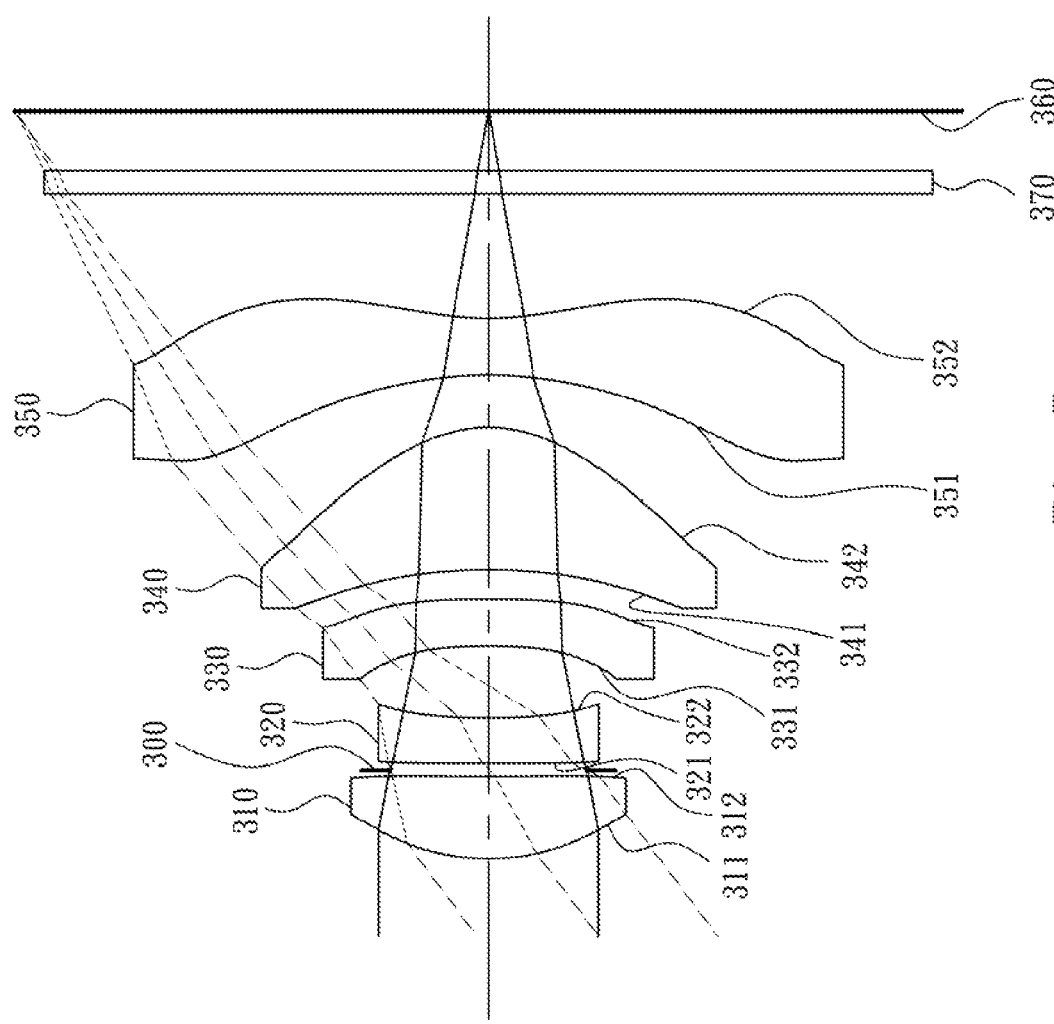
FIG. 7 is a schematic view of a photographing optical lens assembly according to the third embodiment.
Figure 8:
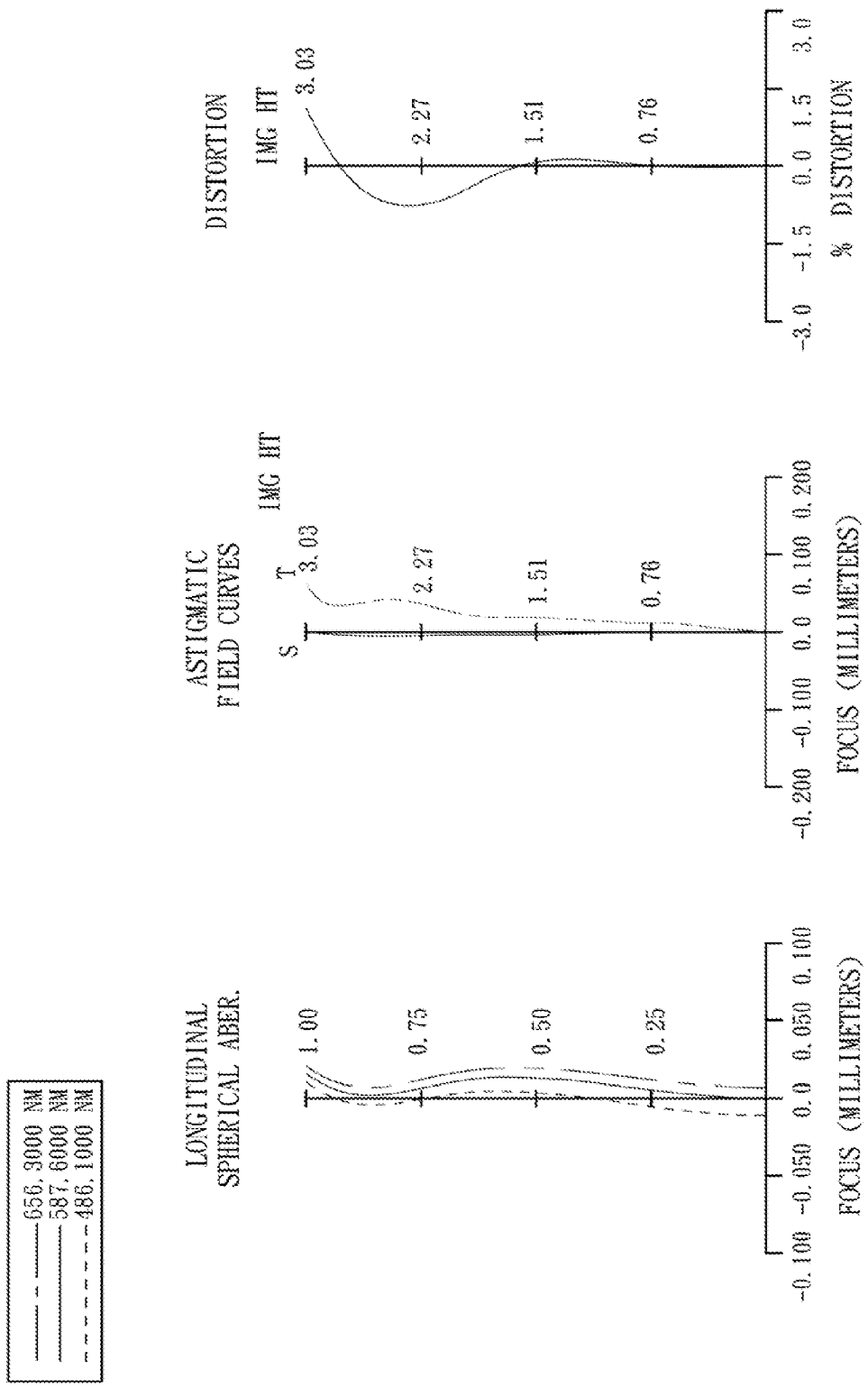
FIG. 8 shows spherical aberration curves, astigmatic field curves and distortion curve of the photographing optical lens assembly according to the third embodiment.

FIG. 7 is a schematic view of a photographing optical lens assembly according to the third embodiment. FIG. 8 shows spherical aberration curves, astigmatic field curves and distortion curve of the third embodiment according to the third embodiment. In FIG. 7, the photographing optical lens assembly includes, in order from an object side to an image side: the first lens element 310, an aperture stop 300, the second lens element 320, the third lens element 330, the fourth lens element 340, the fifth lens element 350, an IR (infrared) cut filter 370 and an image plane 360.

The first lens element 310 is made of plastic material. The first lens element 310 with positive refractive power has a convex object-side surface 311 and a concave image-side surface 312. The object-side surface 311 and the image-side surface 312 of the first lens element 310 are aspheric.

The second lens element 320 is made of plastic material. The second lens element 320 with negative refractive power has a convex object-side surface 321 and a concave image-side surface 322. The object-side surface 321 and the image-side surface 322 of the second lens element 320 are aspheric.

The third lens element 330 is made of plastic material. The third lens element 330 with negative refractive power has a concave object-side surface 331 and a convex image-side surface 332. The object-side surface 331 and the image-side surface 332 of the third lens element 330 are aspheric.

The fourth lens element 340 is made of plastic material. The fourth lens element 340 with positive refractive power has a concave object-side surface 341 and a convex image-side surface 342. The object-side surface 341 and the image-side surface 342 of the fourth lens element 340 are aspheric.

The fifth lens element 350 is made of plastic material. The fifth lens element 350 with negative refractive power has a concave object-side surface 351 and a concave image-side surface 352. The object-side surface 351 and the image-side surface 352 of the fifth lens element 350 are aspheric. Furthermore, the fifth lens element 350 has at least one inflection point formed on at least one of the object-side surface 351 or the image-side surface 352 thereof.

The IR cut filter 370 is made of glass and is located between the fifth lens element 350 and the image plane 360 and will not affect the focal length of the photographing optical lens assembly.

The equation of the aspheric surface profiles of the above lens elements of the third embodiment is the same as that of the first embodiment, and will not be stated herein again.

In the photographing optical lens assembly according to the third embodiment, the definitions of f, Fno and HFOV are the same as those stated in the first embodiment with corresponding values for the third embodiment, and they satisfy the following relationships:

$f$=4.00 mm;

$F$no=2.85;

and

HFOV=37.0 degrees.

In the photographing optical lens assembly according to the third embodiment, the definitions of all variables for conditions provided in the claims (V1, V2, V3, R1, R2, R3, R4, R9, R10, f1, f4, f5, Yc1, Yc2, SL, TTL, and ImgH) are the same as those stated in the first embodiment, with corresponding values for the third embodiment, and they satisfy the following relationships:

$V1-V2=32.1$;

$|V2-V3|=0.0$;

$|R1/R2|=0.07$;

$R4/R3=0.05$;

$R10/R9=-0.72$;

$(R9+R10)/(R9-R10)=0.16$;

$f/f1=1.44$;

$f/f4=2.22$;

$f/f5=-2.22$;

$f/f4-f/f1=0.78$;

$Yc1/ImgH=0.63$;

$Yc2/ImgH=0.71$;

$SL/TTL=0.88$;

and $TTL/ImgH=1.57$.

The detailed optical data of the third embodiment is shown in Table 5, and the aspheric surface data is shown in Table 6 as follows.

TABLE 5

(Embodiment 3)
f = 4.00 mm, Fno = 2.85, HFOV = 37.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.41802 (ASP) | 0.533 | Plastic | 1.544 | 55.9 | 2.77 |
| 2 | | 21.27660 (ASP) | 0.040 | | | | |
| 3 | Ape. Stop | Plano | 0.040 | | | | |
| 4 | Lens 2 | 83.33333 (ASP) | 0.290 | Plastic | 1.634 | 23.8 | -6.60 |
| 5 | | 3.97640 (ASP) | 0.467 | | | | |
| 6 | Lens 3 | -3.66752 (ASP) | 0.295 | Plastic | 1.634 | 23.8 | -10.00 |
| 7 | | -8.96988 (ASP) | 0.190 | | | | |
| 8 | Lens 4 | -3.55011 (ASP) | 0.915 | Plastic | 1.544 | 55.9 | 1.80 |
| 9 | | -0.83586 (ASP) | 0.339 | | | | |
| 10 | Lens 5 | -2.40720 (ASP) | 0.361 | Plastic | 1.544 | 55.9 | -1.80 |
| 11 | | 1.73890 (ASP) | 0.800 | | | | |
| 12 | IR-filter | Plano | 0.145 | Glass | 1.517 | 64.2 | — |
| 13 | | Plano | 0.384 | | | | |
| 14 | Image | Plano | — | | | | |

Note:
Reference wavelength (d-line) is 587.6 nm

TABLE 6

| Aspheric Coefficients | | | | | |
|---|---|---|---|---|---|
| Surface # | 1 | 2 | 4 | 5 | 6 |
| k = | -6.32834E+00 | -1.00000E+00 | -1.00000E+00 | 1.40743E-01 | -2.25356E+01 |
| A4 = | 2.69664E-01 | -3.84327E-02 | 9.59499E-03 | 5.28936E-02 | -2.80948E-01 |
| A6 = | -2.55655E-01 | 3.13305E-02 | 2.71236E-02 | 6.01696E-02 | -1.86858E-01 |
| A8 = | 2.80890E-01 | -2.03350E-01 | 2.37482E-01 | 1.10797E-01 | 3.89031E-01 |
| A10 = | -2.16563E-01 | 3.53228E-01 | -8.79865E-01 | -2.27740E-01 | -4.11566E-01 |
| A12 = | -8.07451E-03 | -3.24746E-01 | 1.42254E+00 | 4.47388E-01 | 2.87241E-01 |
| A14 = | 2.41508E-02 | 1.07361E-01 | -7.16280E-01 | -1.67673E-01 | |
| Surface # | 7 | 8 | 9 | 10 | 11 |
| k = | 1.27439E+01 | 4.99963E+00 | -2.91132E+00 | -9.58860E+00 | -1.58286E+01 |
| A4 = | -1.19107E-01 | -1.90671E-02 | -1.57707E-01 | -4.08637E-03 | -6.08370E-02 |
| A6 = | -1.27289E-01 | 8.24083E-02 | 1.53572E-01 | -2.89288E-02 | 1.71294E-02 |
| A8 = | 1.80496E-01 | -2.23453E-01 | -1.26972E-01 | 1.18587E-02 | -6.47776E-03 |
| A10 = | -4.96931E-02 | 2.95167E-01 | 6.62875E-02 | -8.04870E-04 | 1.63914E-03 |
| A12 = | 8.06674E-03 | -1.70246E-01 | -1.64574E-02 | -1.84129E-04 | -2.31302E-04 |
| A14 = | | 3.66358E-02 | 1.37626E-03 | 2.21605E-05 | 1.48446E-05 |

Figure 9:
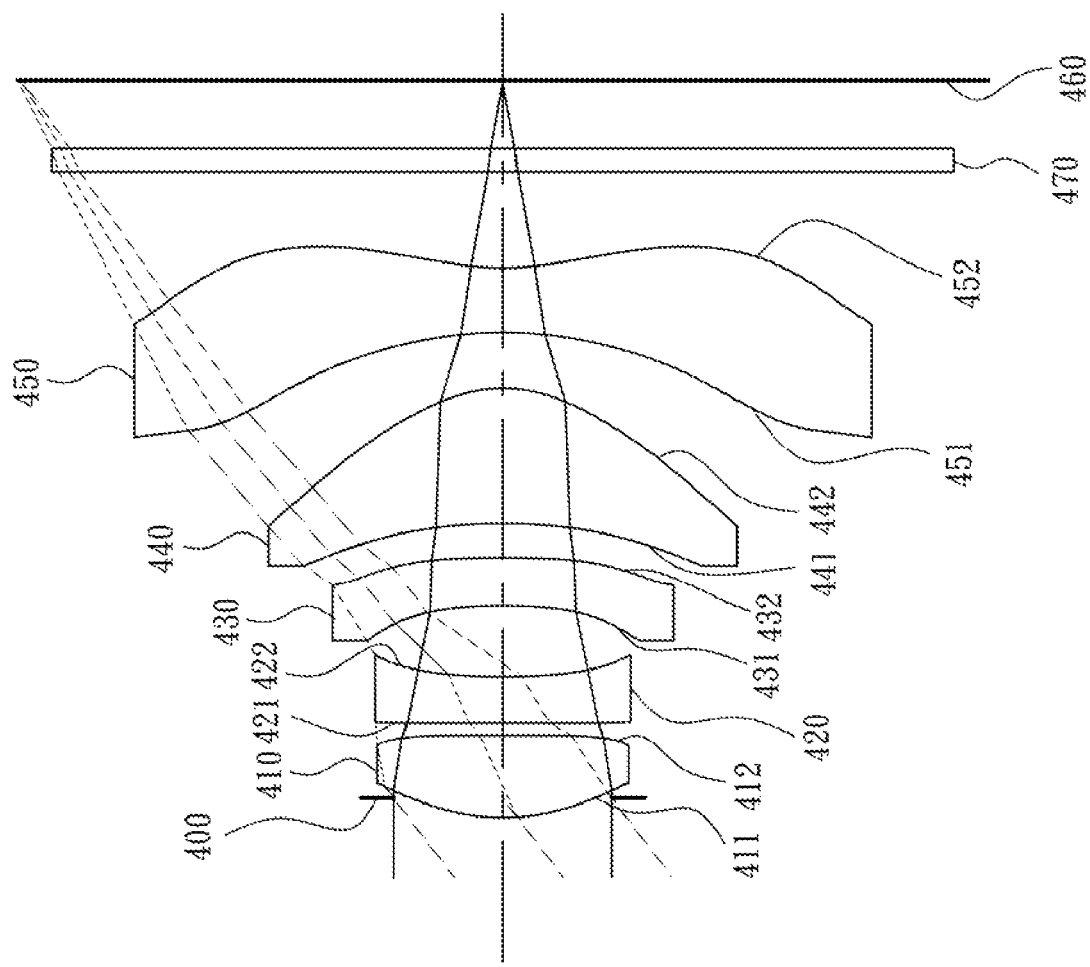
FIG. 9 is a schematic view of a photographing optical lens assembly according to the fourth embodiment.
Figure 10:
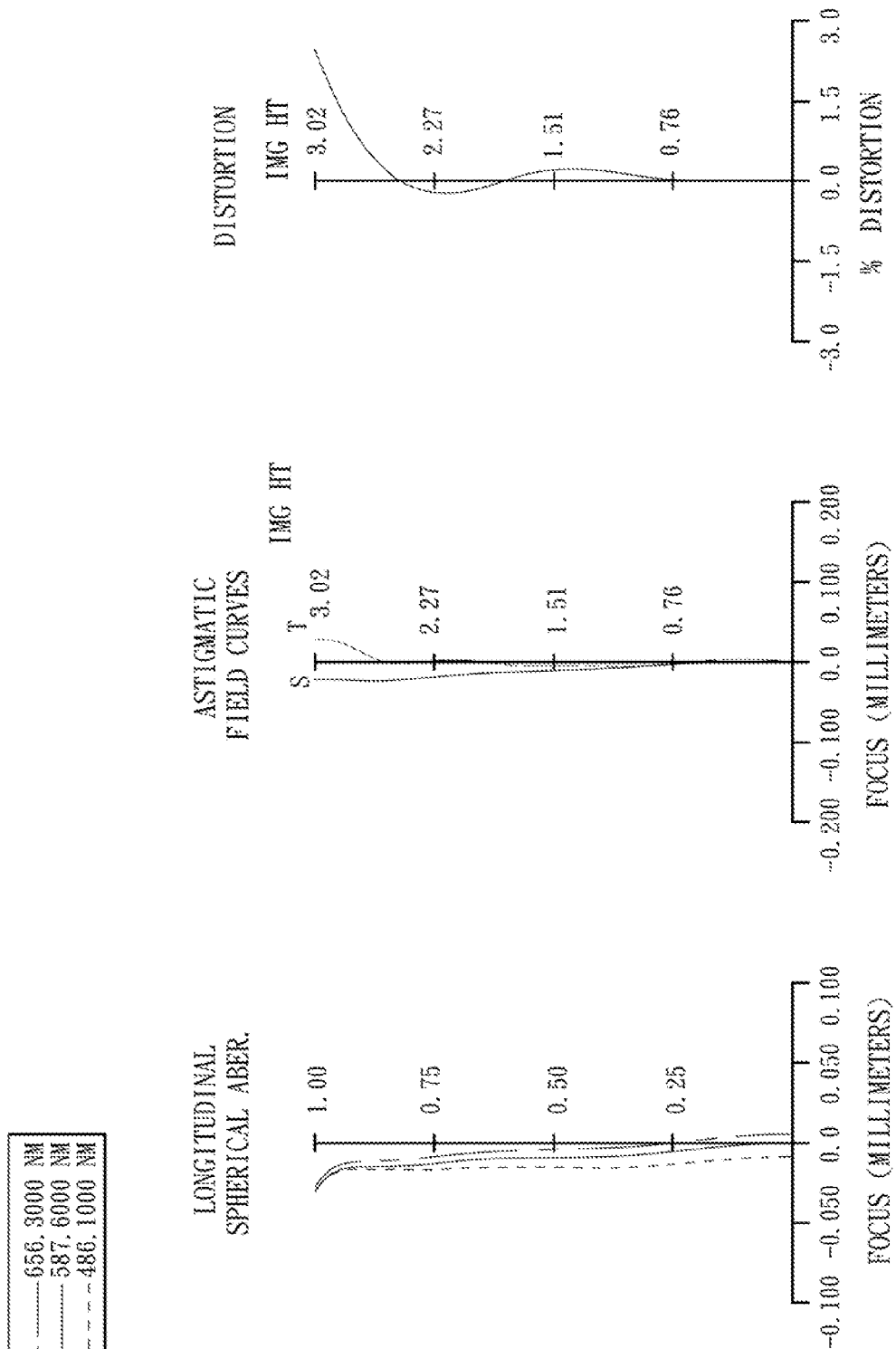
FIG. 10 shows spherical aberration curves, astigmatic field curves and distortion curve of the photographing optical lens assembly according to the fourth embodiment.

FIG. 9 is a schematic view of a photographing optical lens assembly according to the fourth embodiment. FIG. 10 shows spherical aberration curves, astigmatic field curves and distortion curve of the photographing optical lens assembly according to the fourth embodiment. In FIG. 9, the photographing optical lens assembly includes, in order from an object side to an image side: an aperture stop 400, the first lens element 410, the second lens element 420, the third lens element 430, the fourth lens element 440, the fifth lens element 450, an IR (infrared) cut filter 470 and an image plane 460.

The first lens element 410 is made of plastic material. The first lens element 410 with positive refractive power has a convex object-side surface 411 and a convex image-side surface 412. The object-side surface 411 and the image-side surface 412 of the first lens element 410 are aspheric.

The second lens element 420 is made of plastic material. The second lens element 420 with negative refractive power has a concave object-side surface 421 and a concave image-side surface 422. The object-side surface 421 and the image-side surface 422 of the second lens element 420 are aspheric.

The third lens element 430 is made of plastic material. The third lens element 430 with negative refractive power has a concave object-side surface 431 and a convex image-side surface 432. The object-side surface 431 and the image-side surface 432 of the third lens element 430 are aspheric.

The fourth lens element 440 is made of plastic material. The fourth lens element 440 with positive refractive power has a concave object-side surface 441 and a convex image-side surface 442. The object-side surface 441 and the image-side surface 442 of the fourth lens element 440 are aspheric.

The fifth lens element 450 is made of plastic material. The fifth lens element 450 with negative refractive power has a concave object-side surface 451 and a concave image-side surface 452. The object-side surface 451 and the image-side surface 452 of the fifth lens element 450 are aspheric. Furthermore, the fifth lens element 450 has at least one inflection point formed on at least one of the object-side surface 451 or the image-side surface 452 thereof.

The IR cut filter 470 is made of glass and is located between the fifth lens element 450 and the image plane 460 and will not affect the focal length of the photographing optical lens assembly.

The equation of the aspheric surface profiles of the above lens elements of the fourth embodiment is the same as that of the first embodiment, and will not be stated herein again.

In the photographing optical lens assembly according to the fourth embodiment, the definitions of f, Fno and HFOV are the same as those stated in the first embodiment with corresponding values for the fourth embodiment, and they satisfy the following relationships:

$f = 3.90$ mm;

$Fno = 2.85$;

and $HFOV = 37.2$ degrees.

In the photographing optical lens assembly according to the fourth embodiment, the definitions of all variables for conditions provided in the claims (V1, V2, V3, R1, R2, R3, R4, R9, R10, f1, f4, f5, Yc1, Yc2, SL, TTL, and ImgH) are the same as those stated in the first embodiment with corresponding values for the fourth embodiment, and they satisfy the following relationships:

$V1 - V2 = 32.1$;

$|V2 - V3| = 0.0$;

$|R1/R2| = 0.02$;

$R4/R3 = -0.08$;

$R10/R9 = -0.74$;

$(R9 + R10)/(R9 - R10) = 0.15$;

$f/f1 = 1.51$;

$f/f4 = 2.02$;

$f/f5 = -2.17$;

$f/f4 - f/f1 = 0.51$;

$Yc1/ImgH = 0.70$;

$Yc2/ImgH = 0.72$;

$SL/TTL = 0.97$;

and $TTL/ImgH = 1.52$.

The detailed optical data of the fourth embodiment is shown in Table 7, and the aspheric surface data is shown in Table 8 as follows.

TABLE 7

(Embodiment 4)
f = 3.90 mm, Fno = 2.85, HFOV = 37.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.120 | | | | |
| 2 | Lens 1 | 1.42677 (ASP) | 0.512 | Plastic | 1.544 | 55.9 | 2.58 |
| 3 | | −69.75549 (ASP) | 0.080 | | | | |
| 4 | Lens 2 | −52.41625 (ASP) | 0.290 | Plastic | 1.634 | 23.8 | −5.88 |
| 5 | | 4.02472 (ASP) | 0.445 | | | | |
| 6 | Lens 3 | −3.89004 (ASP) | 0.303 | Plastic | 1.634 | 23.8 | −11.19 |
| 7 | | −8.87532 (ASP) | 0.214 | | | | |
| 8 | Lens 4 | −3.53317 (ASP) | 0.850 | Plastic | 1.544 | 55.9 | 1.93 |
| 9 | | −0.87684 (ASP) | 0.349 | | | | |
| 10 | Lens 5 | −2.37655 (ASP) | 0.409 | Plastic | 1.544 | 55.9 | −1.80 |
| 11 | | 1.76269 (ASP) | 0.600 | | | | |

TABLE 7-continued (Embodiment 4)
f = 3.90 mm, Fno = 2.85, HFOV = 37.2 deg.

| Surface # | | Curvature Radius | Thickness | Material | Index | Abbe # | Focal length |
|---|---|---|---|---|---|---|---|
| 12 | IR-filter | Plano | 0.145 | Glass | 1.517 | 64.2 | — |
| 13 | | Plano | 0.435 | | | | |
| 14 | Image | Plano | — | | | | |

Note:
Reference wavelength (d-line) is 587.6 nm

TABLE 8

Aspheric Coefficients

| Surface # | 2 | 3 | 4 | 5 | 6 |
|---|---|---|---|---|---|
| k = | −6.03406E+00 | −1.00000E+00 | −1.00000E+00 | 2.64437E+00 | −3.16098E+01 |
| A4 = | 2.52719E−01 | −5.41881E−02 | 2.06788E−02 | 5.79130E−02 | −2.80465E−01 |
| A6 = | −2.95462E−01 | −1.20016E−02 | 2.11070E−02 | 8.38295E−02 | −1.79698E−01 |
| A8 = | 3.63663E−01 | −2.02046E−01 | 1.94998E−01 | 5.73653E−02 | 4.14579E−01 |
| A10 = | −4.12187E−01 | 1.70261E−01 | −9.40797E−02 | −2.19256E−01 | −4.33381E−01 |
| A12 = | 1.88902E−02 | −3.24745E−01 | 1.42254E+00 | 4.47389E−01 | 2.87655E−01 |
| A14 = | −1.58579E−02 | 1.07361E−01 | −7.16280E−01 | −1.67673E−01 | |

| Surface # | 7 | 8 | 9 | 10 | 11 |
|---|---|---|---|---|---|
| k = | 2.07188E+01 | 5.05796E+00 | −3.00763E+00 | −8.13548E+00 | −1.48294E+01 |
| A4 = | −1.21604E−01 | −2.20965E−02 | −1.48137E−01 | −5.53829E−03 | −5.87746E−02 |
| A6 = | −1.24800E−01 | 8.13053E−02 | 1.55132E−01 | −2.89847E−02 | 1.66696E−02 |
| A8 = | 1.82554E−01 | −2.22950E−01 | −1.27533E−01 | 1.18443E−02 | −6.50097E−03 |
| A10 = | −4.58307E−02 | 2.95345E−01 | 6.63540E−02 | −8.06426E−04 | 1.65245E−03 |
| A12 = | 9.67362E−03 | −1.70631E−01 | −1.65314E−02 | −1.85387E−04 | −2.31931E−04 |
| A14 = | | 3.68023E−02 | 1.27449E−03 | 2.24795E−05 | 1.42507E−05 |

Figure 11:
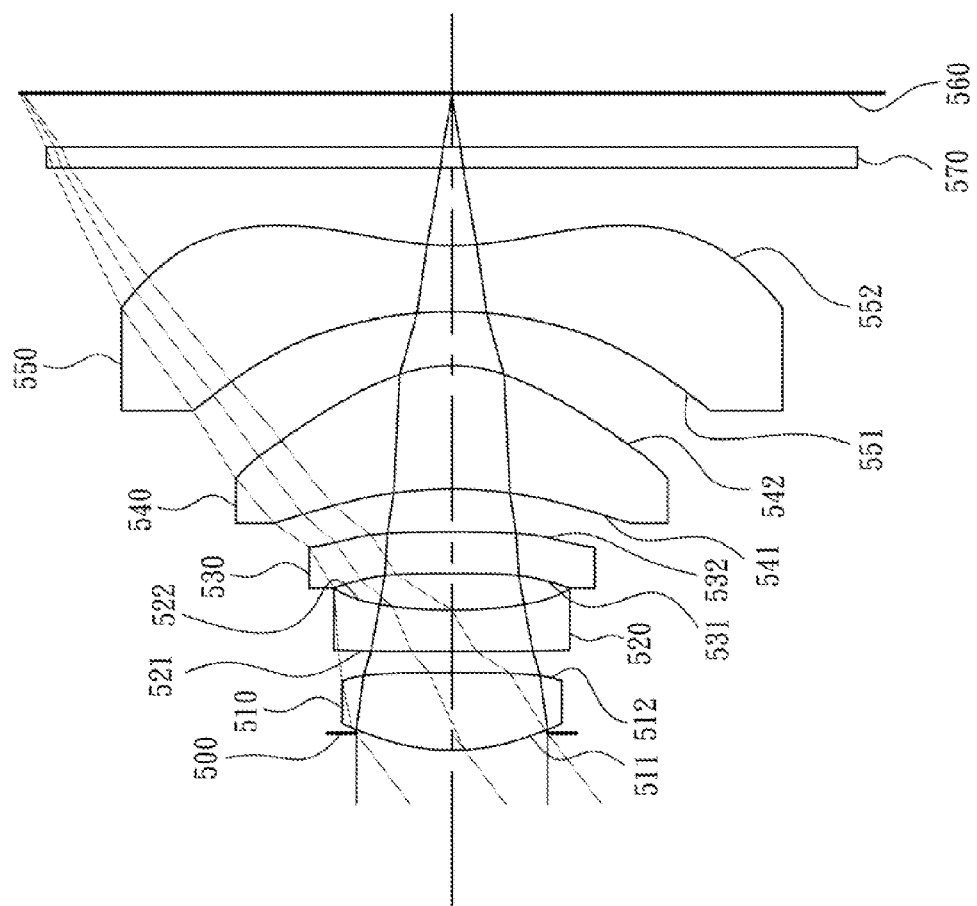
FIG. 11 is a schematic view of a photographing optical lens assembly according to the fifth embodiment.
Figure 12:
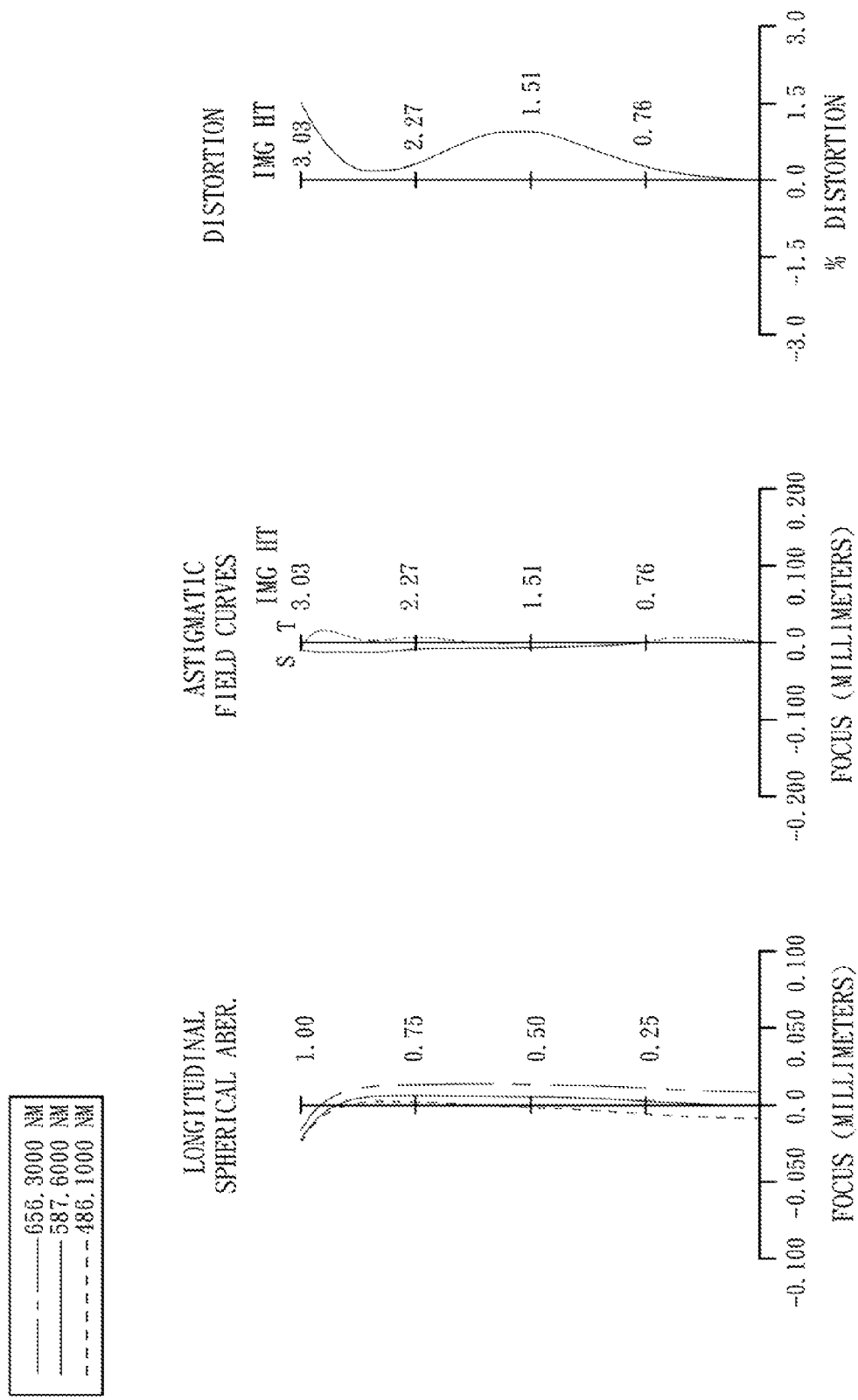
FIG. 12 shows spherical aberration curves, astigmatic field curves and distortion curve of the photographing optical lens assembly according to the fifth embodiment.

FIG. 11 is a schematic view of a photographing optical lens assembly according to the fifth embodiment. FIG. 12 shows spherical aberration curves, astigmatic field curves and distortion curve of the photographing optical lens assembly according to the fifth embodiment. In FIG. 11, the photographing optical lens assembly includes, in order from an object side to an image side: an aperture stop 500, the first lens element 510, the second lens element 520, the third lens element 530, the fourth lens element 540, the fifth lens element 550, an IR (infrared) cut filter 570 and an image plane 560.

The first lens element 510 is made of plastic material. The first lens element 510 with positive refractive power has a convex object-side surface 511 and a convex image-side surface 512. The object-side surface 511 and the image-side surface 512 of the first lens element 510 are aspheric.

The second lens element 520 is made of plastic material. The second lens element 520 with negative refractive power has a concave object-side surface 521 and a concave image-side surface 522. The object-side surface 521 and the image-side surface 522 of the second lens element 520 are aspheric.

The third lens element 530 is made of plastic material. The third lens element 530 with positive refractive power has a concave object-side surface 531 and a convex image-side surface 532. The object-side surface 531 and the image-side surface 532 of the third lens element 530 are aspheric.

The fourth lens element 540 is made of plastic material. The fourth lens element 540 with positive refractive power has a concave object-side surface 541 and a convex image-side surface 542. The object-side surface 541 and the image-side surface 542 of the fourth lens element 540 are aspheric.

The fifth lens element 550 is made of plastic material. The fifth lens element 550 with negative refractive power has a concave object-side surface 551 and a concave image-side surface 552. The object-side surface 551 and the image-side surface 552 of the fifth lens element 550 are aspheric. Furthermore, the fifth lens element 550 has at least one inflection point formed at least one of on the object-side surface 551 or the image-side surface 552 thereof.

The IR cut filter 570 is made of glass and is located between the fifth lens element 550 and the image plane 560 and will not affect the focal length of the photographing optical lens assembly.

The equation of the aspheric surface profiles of the above lens elements of the fifth embodiment is the same as that of the first embodiment, and will not be stated herein again.

In the photographing optical lens assembly according to the fifth embodiment, the definitions of f, Fno and HFOV are the same as those stated in the first embodiment with corresponding values for the fifth embodiment, and they satisfy the following relationships:

$f$=3.94 mm;

$F$no=2.90;

and

HFOV=37.3 degrees.

In the photographing optical lens assembly according to the fifth embodiment, the definitions of all variables for conditions provided in the claims (V1, V2, V3, R1, R2, R3, R4, R9, R10, f1, f4, f5, Yc1, Yc2, SL, TTL, and ImgH) are the same as those stated in the first embodiment with corresponding values for the fifth embodiment, and they satisfy the following relationships:

$V1-V2=34.5;$ $|V2-V3|=2.4;$ $|R1/R2|=0.04;$ $R4/R3=-0.03;$ $R10/R9=-0.63;$ $(R9+R10)/(R9-R10)=0.23;$ $SL/TTL=0.97;$ and $TTL/ImgH=1.52.$ The detailed optical data of the fifth embodiment is shown in Table 9, and the aspheric surface data is shown in Table 10 as follows.

TABLE 9

(Embodiment 5)
f = 3.94 mm, Fno = 2.90, HFOV = 37.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.120 | | | | |
| 2 | Lens 1 | 1.52518 (ASP) | 0.546 | Plastic | 1.544 | 55.9 | 2.70 |
| 3 | | −34.05748 (ASP) | 0.152 | | | | |
| 4 | Lens 2 | −102.94209 (ASP) | 0.290 | Plastic | 1.650 | 21.4 | −5.15 |
| 5 | | 3.45936 (ASP) | 0.262 | | | | |
| 6 | Lens 3 | −50.91317 (ASP) | 0.290 | Plastic | 1.634 | 23.8 | 87.72 |
| 7 | | −26.63933 (ASP) | 0.302 | | | | |
| 8 | Lens 4 | −3.02790 (ASP) | 0.872 | Plastic | 1.544 | 55.9 | 2.41 |
| 9 | | −1.00888 (ASP) | 0.380 | | | | |
| 10 | Lens 5 | −2.86269 (ASP) | 0.466 | Plastic | 1.544 | 55.9 | −1.96 |
| 11 | | 1.79526 (ASP) | 0.550 | | | | |
| 12 | IR-filter | Plano | 0.145 | Glass | 1.517 | 64.2 | — |
| 13 | | Plano | 0.381 | | | | |
| 14 | Image | Plano | — | | | | |

Note:
Reference wavelength (d-line) is 587.6 nm

TABLE 10

| Aspheric Coefficients | | | | | |
|---|---|---|---|---|---|
| Surface # | 2 | 3 | 4 | 5 | 6 |
| k = | −7.68819E+00 | −1.00000E+00 | −1.00000E+00 | −3.60373E+00 | −1.00000E+00 |
| A4 = | 2.42654E−01 | −6.58100E−02 | 1.08901E−02 | 3.12847E−02 | −2.30115E−01 |
| A6 = | −3.09133E−01 | −4.06394E−02 | 3.95030E−02 | 1.41771E−01 | −1.61300E−01 |
| A8 = | 2.83647E−01 | −7.79577E−02 | 2.62848E−01 | 8.61166E−02 | 4.98614E−01 |
| A10 = | −2.55078E−01 | 1.22508E−01 | −1.06677E+00 | −3.73222E−01 | −4.91235E−01 |
| A12 = | 1.88917E−02 | −3.24746E−01 | 1.42254E+00 | 4.47388E−01 | 2.87654E−01 |
| A14 = | −1.58594E−02 | 1.07360E−01 | −7.16281E−01 | −1.67674E−01 | |
| Surface # | 7 | 8 | 9 | 10 | 11 |
| k = | 2.65692E+02 | 3.72601E+00 | −3.51218E+00 | −5.96051E+00 | −1.24635E+01 |
| A4 = | −1.42610E−01 | 7.35631E−03 | −1.20116E−01 | −4.64538E−01 | −5.46471E−02 |
| A6 = | −9.67873E−02 | 8.24058E−02 | 1.51904E−01 | −3.07033E−02 | 1.62423E−02 |
| A8 = | 1.91006E−01 | −2.21646E−01 | −1.28637E−01 | 1.14094E−02 | −6.58783E−03 |
| A10 = | −4.52420E−02 | 2.96254E−01 | 6.61948E−02 | −8.32777E−04 | 1.64897E−03 |
| A12 = | 6.82305E−03 | −1.70190E−01 | −1.65352E−02 | −1.91313E−04 | −2.31804E−04 |
| A14 = | | 3.63295E−02 | 1.23702E−03 | 2.37254E−05 | 1.37018E−05 |

$f/f1=1.46;$ $f/f4=1.63;$ $f/f5=-2.01;$ $f/f4-f/f1=0.17;$ $Yc1/ImgH=0.71;$ $Yc2/ImgH=0.73;$

Figure 13:
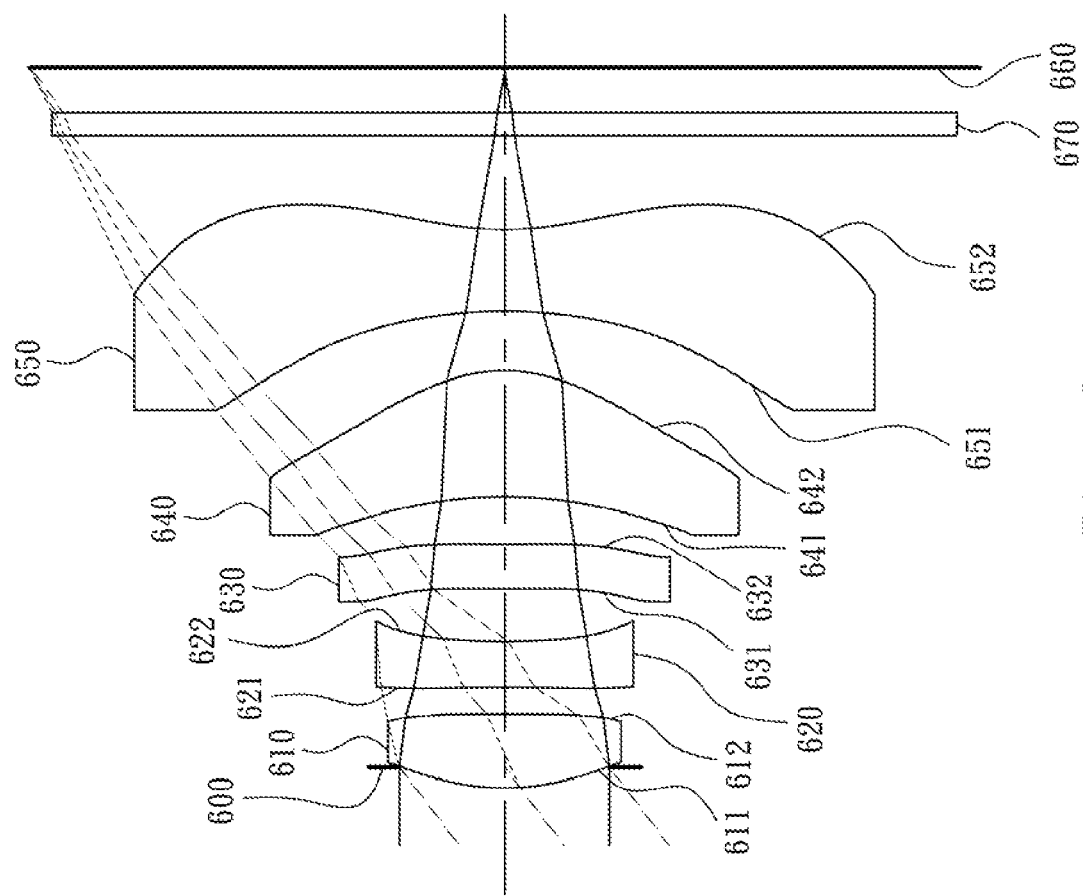
FIG. 13 is a schematic view of a photographing optical lens assembly according to the sixth embodiment.
Figure 14:
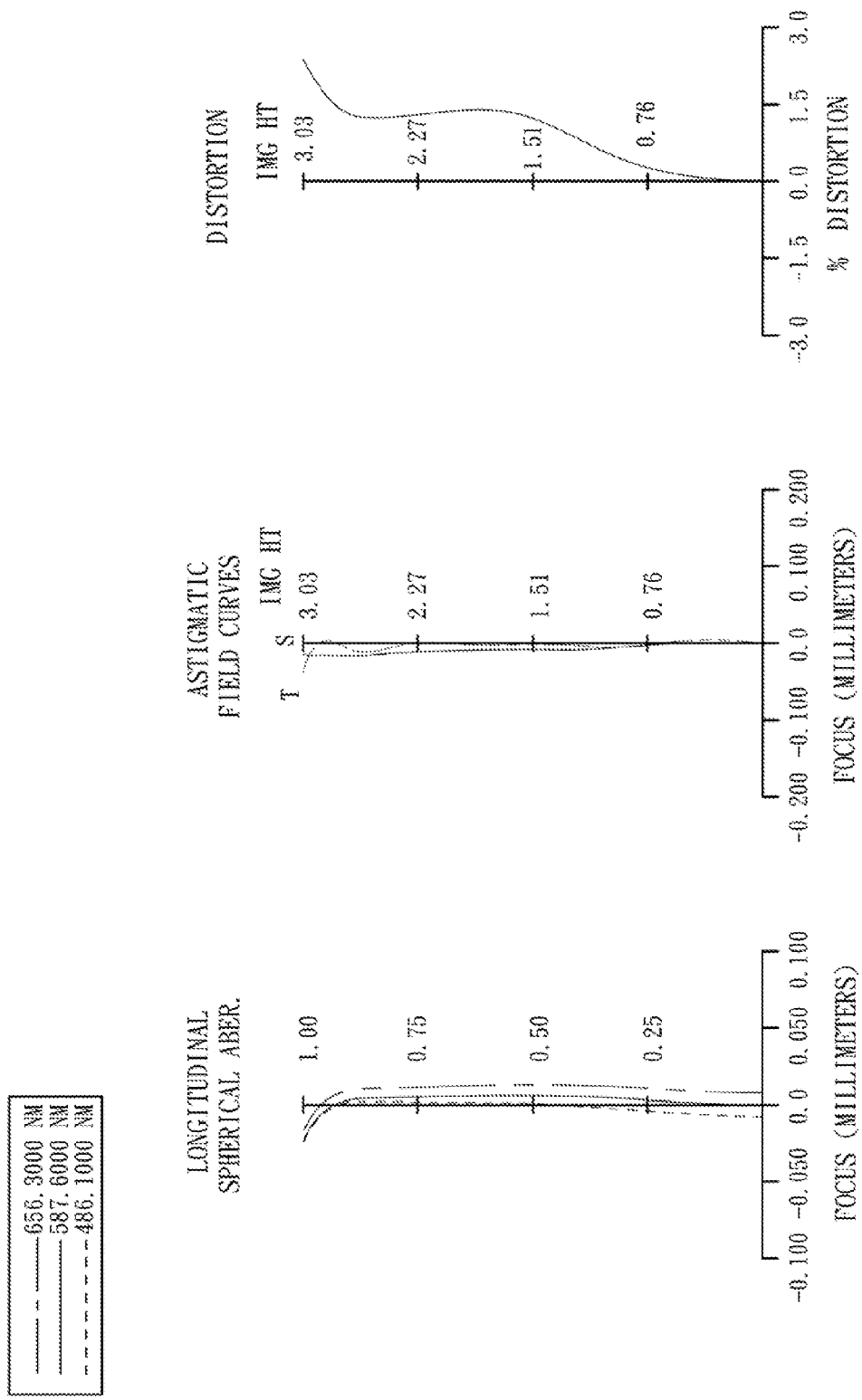
FIG. 14 shows spherical aberration curves, astigmatic field curves and distortion curve of the photographing optical lens assembly according to the sixth embodiment.

FIG. 13 is a schematic view of a photographing optical lens assembly according to the sixth embodiment. FIG. 14, shows spherical aberration curves, astigmatic field curves and distortion curve of the photographing optical lens assembly according to the fifth embodiment. In FIG. 13, the photographing optical lens assembly includes, in order from an object side to an image side: an aperture stop 600, the first lens element 610, the second lens element 620, the third lens element 630, the fourth lens element 640, the fifth lens element 650, an IR (infrared) cut filter 670 and an image plane 660.

The first lens element 610 is made of plastic material. The first lens element 610 with positive refractive power has a convex object-side surface 611 and a convex image-side surface 612. The object-side surface 611 and the image-side surface 612 of the first lens element 610 are aspheric.

The second lens element 620 is made of plastic material. The second lens element 620 with negative refractive power has a concave object-side surface 621 and a concave image-side surface 622. The object-side surface 621 and the image-side surface 622 of the second lens element 620 are aspheric.

The third lens element 630 is made of plastic material. The third lens element 630 with positive refractive power has a convex object-side surface 631 and a concave image-side surface 632. The object-side surface 631 and the image-side surface 632 of the third lens element 630 are aspheric.

The fourth lens element 640 is made of plastic material. The fourth lens element 640 with positive refractive power has a concave object-side surface 641 and a convex image-side surface 642. The object-sick surface 641 and the image-side surface 642 of the fourth lens element 640 are aspheric.

The fifth lens element 650 is made of plastic material. The fifth lens element 650 with negative refractive power has a concave object-side surface 651 and a concave image-side surface 652. The object-side surface 651 and the image-side surface 652 of the fifth lens element 650 are aspheric. Furthermore, the fifth lens element 650 has at least one inflection point formed at least one of on the object-side surface 651 or the image-side surface 652 thereof.

The IR cut filter 670 is made of glass and is located between the fifth lens element 650 and the image plane 660 and will not affect the focal length of the photographing optical lens assembly.

The equation of the aspheric surface profiles of the above lens elements of the sixth embodiment is the same as that of the first embodiment, and will not be stated herein again.

In the photographing optical lens assembly according to the sixth embodiment, the definitions of f, Fno and HFOV are the same as those stated in the first embodiment with corresponding values for the sixth embodiment, and they satisfy the following relationships:

$f$=3.90 mm;

$Fno$=2.90;

and

HFOV=37.3 degrees.

In the photographing optical lens assembly according to the sixth embodiment, the definitions of all variables for conditions provided in the claims (V1, V2, V3, R1, R2, R3, R4, R9, R10, f1, f4, f5, Yc1, Yc2, SL, TTL, and ImgH) are the same as those stated in the first embodiment with corresponding values for the sixth embodiment, and they satisfy the following relationships:

$V1-V2$=35.1;

$|V2-V3|$=2.4;

$|R1/R2|$=0.07;

$R4/R3$=−0.27;

$R10/R9$=−0.58;

$(R9+R10)/(R9-R10)$=0.27;

$f/f1$=1.44;

$f/f4$=1.56;

$f/f5$=−1.97;

$f/f4-f/f1$=0.12;

$Yc1/ImgH$=0.72;

$Yc2/ImgH$=0.75;

$SL/TTL$=0.97; and $TTL/ImgH$=1.50.

The detailed optical data of the sixth embodiment is shown in Table 11, and the aspheric surface data is shown in Table 12 as follows.

TABLE 11

(Embodiment 6)
f = 3.90 mm, Fno = 2.90, HFOV = 37.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.130 | | | | |
| 2 | Lens 1 | 1.56357 (ASP) | 0.469 | Plastic | 1.543 | 56.5 | 2.70 |
| 3 | | −21.93906 (ASP) | 0.172 | | | | |
| 4 | Lens 2 | −16.34116 (ASP) | 0.290 | Plastic | 1.650 | 21.4 | −5.37 |
| 5 | | 4.46676 (ASP) | 0.332 | | | | |
| 6 | Lens 3 | 17.16726 (ASP) | 0.290 | Plastic | 1.634 | 23.8 | 93.15 |
| 7 | | 24.04366 (ASP) | 0.299 | | | | |
| 8 | Lens 4 | −2.88229 (ASP) | 0.802 | Plastic | 1.543 | 56.5 | 2.50 |
| 9 | | −1.01336 (ASP) | 0.379 | | | | |
| 10 | Lens 5 | −3.05045 (ASP) | 0.521 | Plastic | 1.543 | 56.5 | −1.98 |
| 11 | | 1.76739 (ASP) | 0.600 | | | | |
| 12 | IR-filter | Plano | 0.145 | Glass | 1.517 | 64.2 | — |
| 13 | | Plano | 0.292 | | | | |
| 14 | Image | Plano | — | | | | |

Note:
Reference wavelength (d-line) is 587.6 nm

TABLE 12

Aspheric Coefficients

| Surface # | 2 | 3 | 4 | 5 | 6 |
|---|---|---|---|---|---|
| k = | −8.29756E+00 | −1.00000E+00 | −1.00000E+00 | −7.12689E+00 | 9.95970E+01 |
| A4 = | 2.33696E−01 | −7.36560E−02 | 5.72090E−03 | 2.41280E−02 | −2.19943E−01 |
| A6 = | −3.42168E−01 | −5.71297E−02 | 6.34244E−02 | 1.62705E−01 | −1.49831E−01 |
| A8 = | 3.41650E−01 | 3.04855E−02 | 3.37777E−01 | 6.98240E−02 | 5.02890E−01 |
| A10 = | −3.73908E−01 | −2.86502E−02 | −1.11438E+00 | −3.35739E−01 | −4.94133E−01 |
| A12 = | 1.88023E−02 | −3.24937E−01 | 1.42250E+00 | 4.47504E−01 | 2.67222E−01 |
| A14 = | −1.58604E−02 | 1.07379E−01 | −7.16391E−01 | −1.67430E−01 | |

| Surface # | 7 | 8 | 9 | 10 | 11 |
|---|---|---|---|---|---|
| k = | −1.00000E+00 | 4.22712E+00 | −3.49452E+00 | −5.68596E+00 | −1.17232E+01 |
| A4 = | −1.48427E−01 | 1.74931E−02 | −1.19094E−01 | −2.13969E−03 | −5.13849E−02 |
| A6 = | −9.42244E−02 | 8.14274E−02 | 1.57133E−01 | −2.98291E−02 | 1.58461E−02 |
| A8 = | 1.87799E−01 | −2.17904E−01 | −1.26899E−01 | 1.14989E−02 | −6.47203E−03 |
| A10 = | −4.94518E−02 | 2.98330E−01 | 6.61563E−02 | −8.56910E−04 | 1.64553E−03 |
| A12 = | 3.59743E−03 | −1.69648E−01 | −1.66679E−02 | −1.84720E−04 | −2.32008E−04 |
| A14 = | | 3.58441E−02 | 1.18348E−03 | 2.35571E−05 | 1.33017E−05 |

Figure 15:
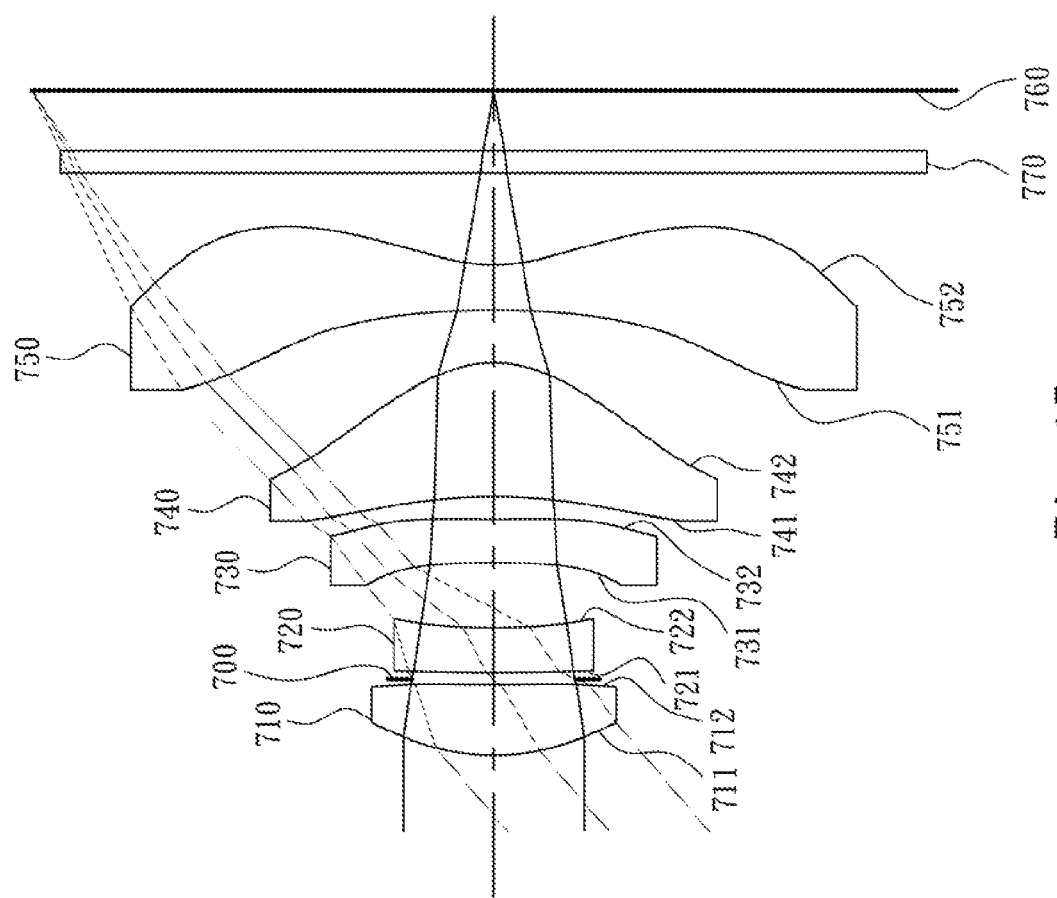
FIG. 15 is a schematic view of a photographing optical lens assembly according to the seventh embodiment.
Figure 16:
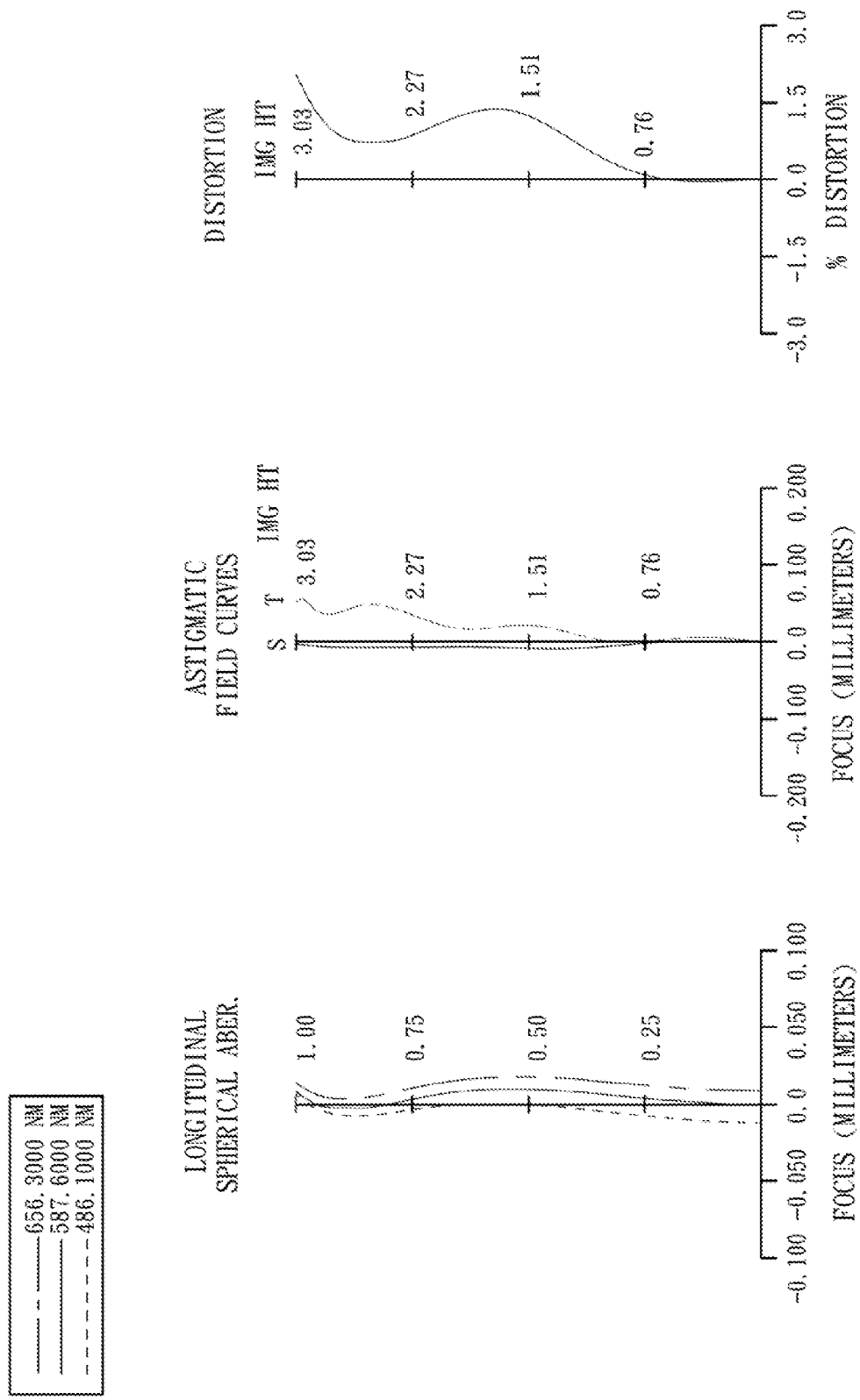
FIG. 16 shows spherical aberration curves, astigmatic field curves and distortion curve of the photographing optical lens assembly according to the seventh embodiment.

FIG. 15 is a schematic view of a photographing optical lens assembly according to the seventh embodiment. FIG. 16 shows spherical aberration curves, astigmatic field curves and distortion curve of the photographing optical lens assembly according to the seventh embodiment. In FIG. 15, the photographing optical lens assembly includes, in order from an object side to an image side: the first lens element 710, an aperture stop 700, the second lens element 720, the third lens element 730, the fourth lens element 740, the fifth lens element 750, an IR (infrared) cut filter 770 and an image plane 760.

The first lens element 710 is made of plastic material. The first lens element 710 with positive refractive power has a convex object-side surface 711 and a concave image-side surface 712. The object-side surface 711 and the image-side surface 712 of the first lens element 710 are aspheric.

The second lens element 720 is made of plastic material. The second lens element 720 with negative refractive power has a convex object-side surface 721 and a concave image-side surface 722. The object-side surface 721 and the image-side surface 722 of the second lens element 720 are aspheric.

The third lens element 730 is made of plastic material. The third lens element 730 with negative refractive power has a concave object-side surface 731 and a concave image-side surface 732. The object-side surface 731 and the image-side surface 732 of the third lens element 730 are aspheric.

The fourth lens element 740 is made of plastic material. The fourth lens element 740 with positive refractive power has a concave object-side surface 741 and a convex image-side surface 742. The object-side surface 741 and the image-side surface 742 of the fourth lens element 740 are aspheric.

The fifth lens element 750 is made of plastic material. The fifth lens element 750 with negative refractive power has a concave object-side surface 751 and a concave image-side surface 752. The object-side surface 751 and the image-side surface 752 of the fifth lens element 750 are aspheric. Furthermore, the fifth lens element 750 has at least one inflection point formed at least one of on the object-side surface 751 or the image-side surface 752 thereof.

The IR cut filter 770 is made of glass and is located between the fifth lens element 750 and the image plane 760 and will not affect the focal length of the photographing optical lens assembly.

The equation of the aspheric surface profiles of the above lens elements of the seventh embodiment is the same as that of the first embodiment, and will not be stated herein again.

In the photographing optical lens assembly according to the seventh embodiment, the definitions off, Fno and HFOV are the same as those stated in the first embodiment with corresponding values for the seventh embodiment, and they satisfy the following relationships:

$f=3.45$ mm;

$Fno=2.90$;

and $HFOV=40.8$ degrees.

In the photographing optical lens assembly according to the seventh embodiment, the definitions of all variables for conditions provided in the claims (V1, V2, V3, R1, R2, R3, R4, R9, R10, f1, f4, f5, Yc1, Yc2, SL, TTL, and ImgH) are the same as those stated in the first embodiment with corresponding values for the seventh embodiment, and they satisfy the following relationships:

$V1-V2=34.3$;

$|V2-V3|=0.0$;

$|R1/R2|=0.07$;

$R4/R3=0.24$;

$R10/R9=-0.22$;

$(R9+R10)/(R9-R10)=0.63$;

$f/f1=1.16$;

$f/f4=2.07$;

$f/f5=-2.14$;

$f/f4-f/f1=0.91$;

$Yc1/ImgH=0.64$;

$Yc2/ImgH=0.66$;

$SL/TTL=0.88$;

and $TTL/ImgH=1.43$.

The detailed optical data of the sixth embodiment is shown in Table 13, and the aspheric surface data is shown in Table 14 as follows.

TABLE 13

(Embodiment 7)
f = 3.45 mm, Fno = 2.90, HFOV = 40.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.48199 (ASP) | 0.467 | Plastic | 1.530 | 55.8 | 2.98 |
| 2 | | 21.27660 (ASP) | 0.040 | | | | |
| 3 | Ape. Stop | Plano | 0.040 | | | | |
| 4 | Lens 2 | 18.03020 (ASP) | 0.290 | Plastic | 1.650 | 21.4 | −8.64 |
| 5 | | 4.25480 (ASP) | 0.428 | | | | |
| 6 | Lens 3 | −12.62164 (ASP) | 0.290 | Plastic | 1.650 | 21.4 | −12.85 |
| 7 | | 24.90887 (ASP) | 0.144 | | | | |
| 8 | Lens 4 | −3.44809 (ASP) | 0.879 | Plastic | 1.530 | 55.8 | 1.67 |
| 9 | | −0.76479 (ASP) | 0.347 | | | | |
| 10 | Lens 5 | −4.76604 (ASP) | 0.300 | Plastic | 1.530 | 55.8 | −1.61 |
| 11 | | 1.06493 (ASP) | 0.600 | | | | |
| 12 | IR-filter | Plano | 0.145 | Glass | 1.517 | 64.2 | — |
| 13 | | Plano | 0.399 | | | | |
| 14 | Image | Plano | — | | | | |

Note:
Reference wavelength (d-line) is 587.6 nm

TABLE 14

| Aspheric Coefficients | | | | | |
|---|---|---|---|---|---|
| Surface # | 1 | 2 | 4 | 5 | 6 |
| k = | −6.77199E+00 | −1.00000E+00 | −1.00000E+00 | −2.95180E+00 | −9.73302E+02 |
| A4 = | 2.41538E−01 | −4.97318E−02 | −4.87689E−03 | 4.28890E−02 | −2.65217E−01 |
| A6 = | −2.32465E−01 | −2.42218E−02 | −4.47041E−02 | −1.05170E−02 | −1.38029E−01 |
| A8 = | 2.11397E−01 | −2.25360E−01 | 3.28642E−01 | 2.29882E−01 | 4.30407E−01 |
| A10 = | −2.12619E−01 | 3.66130E−01 | −1.09263E+00 | −4.40482E−01 | −5.41731E−01 |
| A12 = | −2.48315E−02 | −3.23918E−01 | 1.42254E+00 | 4.47354E−01 | 2.87635E−01 |
| A14 = | −1.72379E−02 | 1.07361E−01 | −7.16280E−01 | −1.67673E−01 | |
| Surface # | 7 | 8 | 9 | 10 | 11 |
| k = | −1.00000E+00 | 5.97950E+00 | −3.06425E+00 | −5.96713E+01 | −7.87830E+00 |
| A4 = | −1.16877E−01 | 3.17589E−02 | −1.64379E−01 | −2.06850E−02 | −5.60708E−02 |
| A6 = | −1.26880E−01 | 8.17322E−02 | 1.68437E−01 | −2.72851E−02 | 1.59764E−02 |
| A8 = | 1.69058E−01 | −2.21973E−01 | −1.19704E−01 | 1.19030E−02 | −6.10641E−03 |
| A10 = | −5.13699E−02 | 2.98280E−01 | 6.66275E−02 | −9.03267E−04 | 1.49078E−03 |
| A12 = | 9.03629E−03 | −1.69549E−01 | −1.71676E−02 | −1.90372E−04 | −2.08256E−04 |
| A14 = | | 3.58512E−02 | 1.05393E−03 | 2.54669E−05 | 1.24427E−05 |

Figure 17:
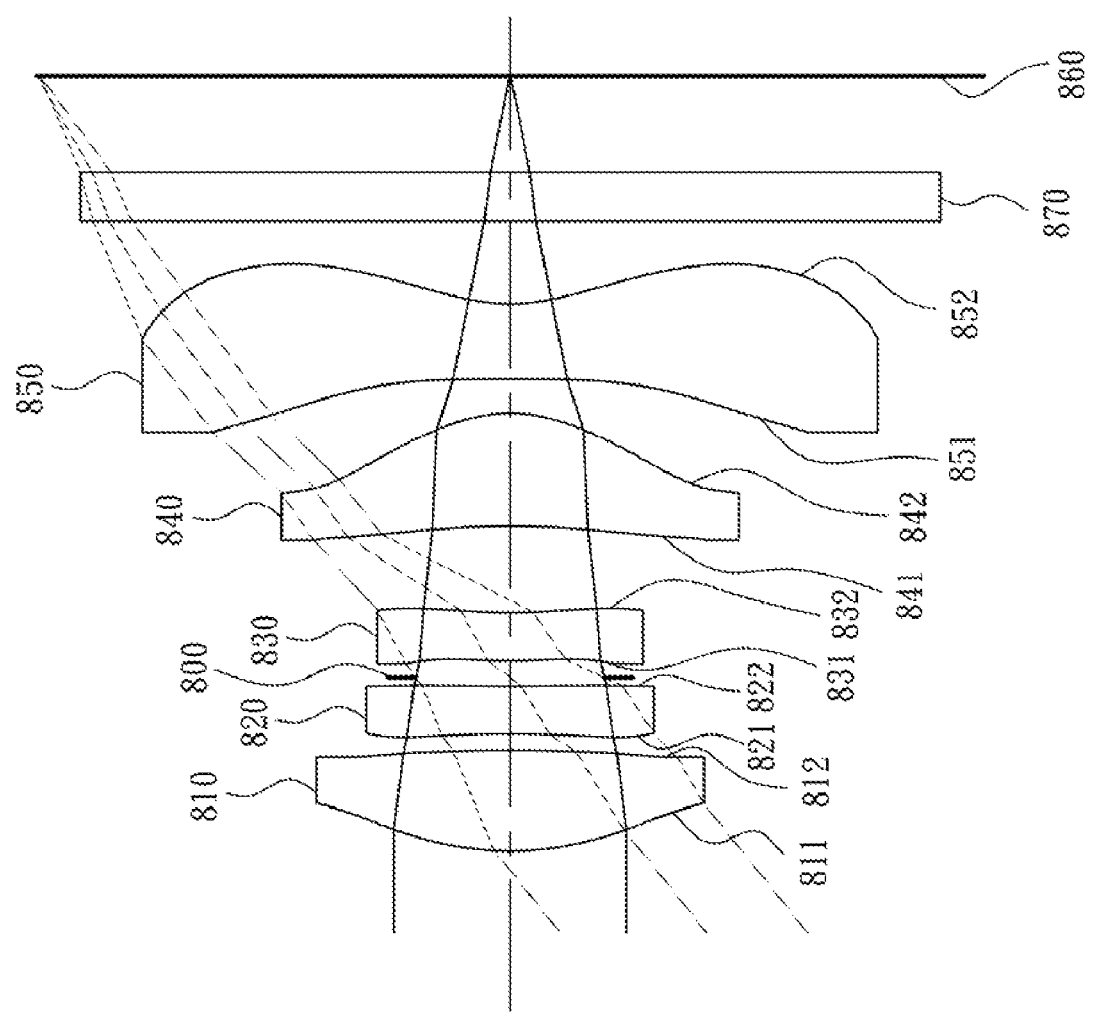
FIG. 17 is a schematic view of a photographing optical lens assembly according to the eighth embodiment.
Figure 18:
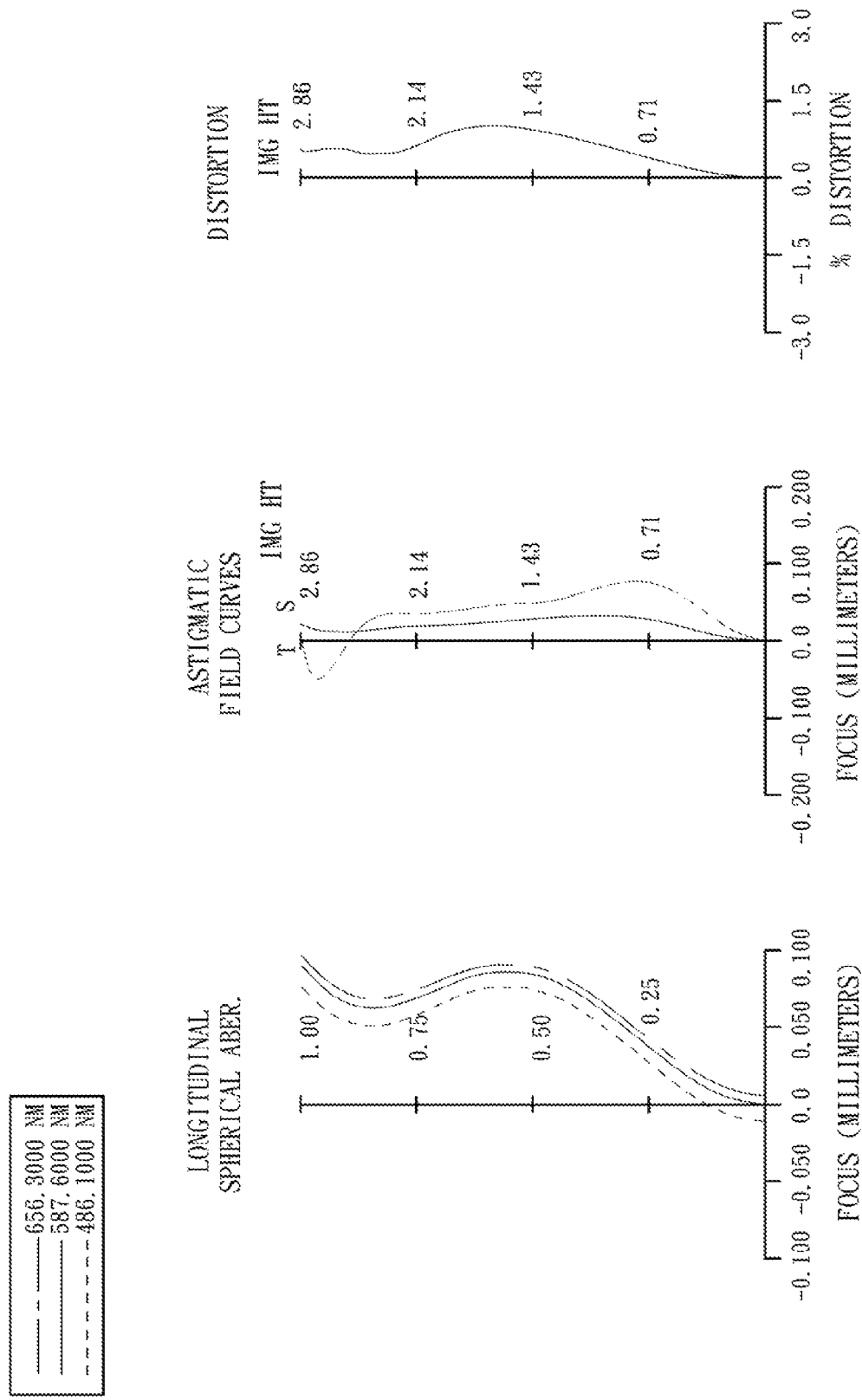
FIG. 18 shows spherical aberration curves, astigmatic field curves and distortion curve of the photographing optical lens assembly according to the eighth embodiment.

FIG. 17 is a schematic view of a photographing optical lens assembly according to the eighth embodiment. FIG. 18 shows spherical aberration curves, astigmatic field curves and distortion curve of the photographing optical lens assembly according to the eighth embodiment. In FIG. 17, the photographing optical lens assembly includes, in order from an object side to an image side: the first lens element 810, the second lens element 820, an aperture stop 800, the third lens element 830, the fourth lens element 840, the fifth lens element 850, an IR (infrared) cut filter 870 and an image plane 860.

The first lens element 810 is made of plastic material. The first lens element 810 with positive refractive power has a convex object-side surface 811 and a convex image-side surface 812. The object-side surface S11 and the image-side surface 812 of the first lens element 810 are aspheric.

The second lens element 820 is made of plastic material. The second lens element 820 with negative refractive power has a concave object-side surface 821 and a concave image-side surface 822. The object-side surface 821 and the image-side surface 822 of the second lens element 820 are aspheric.

The third lens element 830 is made of plastic material. The third lens element 830 with negative refractive power has a convex object-side surface 831 and a concave image-side surface 832. The object-side surface 831 and the image-side surface 832 of the third lens element 830 are aspheric.

The fourth lens element 840 is made of plastic material. The fourth lens element 840 with positive refractive power has a concave object-side surface 841 and a convex image-side surface 842. The object-side surface 841 and the image-side surface 842 of the fourth lens element 840 are aspheric.

The fifth lens element 850 is made of plastic material. The fifth lens element 850 with negative refractive power has a concave object-side surface 851 and a concave image-side surface 852. The object-side surface 851 and the image-side surface 852 of the fifth lens element 850 are aspheric. Furthermore, the fifth lens element 850 has at least one inflection point formed at least one of on the object-side surface 851 or the image-side surface 852 thereof.

The IR cut filter 870 is made of glass and is located between the fifth lens element 850 and the image plane 860 and will not affect the focal length of the photographing optical lens assembly.

The equation of the aspheric surface profiles of the above lens elements of the eighth embodiment is the same as that of the first embodiment, and will not stated herein again.

In the photographing optical lens assembly according to the eighth embodiment, the definitions of f, Fno and HFOV are the same as those stated in the first embodiment with corresponding values for the eighth embodiment, and they satisfy the following relationships:

$f$=3.61 mm;

$Fno$=2.50;

and

HFOV=38.6 degrees.

In the photographing optical lens assembly according to the eighth embodiment, the definitions of all variables for conditions provided in the claims (V1, V2, V3, R1, R2, R3, R4, R9, R10, f1, f4, f5, Yc1, Yc2, SL, TTL, and ImgH) are the same as those stated in the first embodiment with corresponding values for the eighth embodiment, and they satisfy the following relationships:

$V1-V2$=32.5;

$|V2-V3|$=0.0;

$|R1/R2|$=0.17;

$R4/R3$=−2.00;

$R10/R9$=−0.05;

$(R9+R10)/(R9-R10)$=0.90;

$f/f1$=1.21;

$f/f4$=1.98;

$f/f5$=−1.97;

$f/f4-f/f1$=0.77;

$Yc1/ImgH$=0.65;

$Yc2/ImgH$=0.68;

$SL/TTL$=0.77;

and $TTL/ImgH$=1.60.

The detailed optical data of the eighth embodiment is shown in Table 15, and the aspheric surface data is shown in Table 16 as follows.

TABLE 15

(Embodiment 8)
f = 3.61 mm, Fno = 2.50, HFOV = 38.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.86375 (ASP) | 0.604 | Plastic | 1.544 | 55.9 | 2.98 |
| 2 | | −10.99856 (ASP) | 0.100 | | | | |
| 3 | Lens 2 | −5.81257 (ASP) | 0.290 | Plastic | 1.632 | 23.4 | −6.09 |
| 4 | | 11.61103 (ASP) | 0.053 | | | | |
| 5 | Ape. Stop | Plano | 0.099 | | | | |
| 6 | Lens 3 | 4.17566 (ASP) | 0.290 | Plastic | 1.632 | 23.4 | −30.89 |
| 7 | | 3.34741 (ASP) | 0.524 | | | | |
| 8 | Lens 4 | −5.02329 (ASP) | 0.684 | Plastic | 1.544 | 55.9 | 1.82 |
| 9 | | −0.86656 (ASP) | 0.203 | | | | |
| 10 | Lens 5 | −19.98826 (ASP) | 0.453 | Plastic | 1.530 | 55.8 | −1.83 |
| 11 | | 1.02834 (ASP) | 0.500 | | | | |
| 12 | IR-filter | Plano | 0.300 | Glass | 1.517 | 64.2 | — |
| 13 | | Plano | 0.580 | | | | |
| 14 | Image | Plano | — | | | | |

Note:
Reference wavelength (d-line) is 587.6 nm

TABLE 16

| Aspheric Coefficients | | | | | |
|---|---|---|---|---|---|
| Surface # | 1 | 2 | 3 | 4 | 6 |
| k = | −1.22676E+01 | −1.00000E+00 | −1.00000E+00 | −1.00000E+00 | −1.00000E+00 |
| A4 = | 1.96810E−01 | −3.61378E−03 | 6.39286E−02 | −1.43570E−01 | −5.00443E−01 |
| A6 = | −2.30376E−01 | 4.25250E−02 | 6.34389E−02 | 1.44551E−01 | 2.97931E−01 |
| A8 = | 2.09236E−01 | −1.90438E−01 | 1.64203E−01 | 2.05044E−01 | −1.63586E−01 |
| A10 = | −1.58118E−01 | 3.42405E−01 | −8.64066E−01 | −6.34534E−01 | −3.92376E−01 |
| A12 = | 4.36716E−02 | −3.28943E−01 | 1.43195E+00 | 4.47389E−01 | 2.91567E−01 |
| A14 = | 2.79038E−03 | 1.42963E−01 | −7.16280E−01 | −1.67673E−01 | |
| Surface # | 7 | 8 | 9 | 10 | 11 |
| k = | −1.00000E+00 | 1.62579E+01 | −3.95737E+00 | 6.77354E+01 | −7.00363E+00 |
| A4 = | −2.35854E−01 | 4.30353E−02 | −1.33575E−01 | −5.82502E−02 | −8.27554E−02 |

TABLE 16-continued

| Aspheric Coefficients | | | | | |
|---|---|---|---|---|---|
| A6 = | −4.46925E−02 | 9.08844E−02 | 1.64418E−01 | −1.26989E−02 | 3.23043E−02 |
| A8 = | 3.61640E−01 | −2.31022E−01 | −1.12420E−01 | 1.78971E−02 | −1.07395E−02 |
| A10 = | −3.26232E−01 | 2.88983E−01 | 6.87520E−02 | −2.20731E−03 | 1.92395E−03 |
| A12 = | 1.61919E−02 | −1.70383E−01 | −1.74628E−02 | −8.16673E−04 | −1.29986E−04 |
| A14 = | | 4.09365E−02 | 1.28723E−04 | 1.54935E−04 | −3.04600E−06 |

Table 17 is the data of the respective embodiments resulting from the aforementioned equations.

TABLE 17

| | Embodiments | | | | | | | |
|---|---|---|---|---|---|---|---|---|
| | 1st | 2nd | 3rd | 4th | 5th | 6th | 7th | 8th |
| f | 3.83 | 3.83 | 4.00 | 3.90 | 3.94 | 3.90 | 3.45 | 3.61 |
| Fno | 2.70 | 2.70 | 2.85 | 2.85 | 2.90 | 2.90 | 2.90 | 2.50 |
| HFOV | 37.6 | 37.4 | 37.0 | 37.2 | 37.3 | 37.3 | 40.8 | 38.6 |
| V1 − V2 | 32.5 | 34.4 | 32.1 | 32.1 | 34.5 | 35.1 | 34.4 | 32.5 |
| |V2 − V3| | 0.0 | 2.0 | 0.0 | 0.0 | 2.4 | 2.4 | 0.0 | 0.0 |
| |R1/R2| | 0.10 | 0.02 | 0.07 | 0.02 | 0.04 | 0.07 | 0.07 | 0.17 |
| R4/R3 | −0.65 | −0.14 | 0.05 | −0.08 | −0.03 | −0.27 | 0.24 | −2.00 |
| R10/R9 | −0.36 | −0.27 | −0.72 | −0.74 | −0.63 | −0.58 | −0.22 | −0.05 |
| (R9 + R10)/(R9 − R10) | 0.47 | 0.57 | 0.16 | 0.15 | 0.23 | 0.27 | 0.63 | 0.90 |
| f/f1 | 1.44 | 1.30 | 1.44 | 1.51 | 1.46 | 1.44 | 1.16 | 1.21 |
| f/f4 | 2.15 | 2.14 | 2.22 | 2.02 | 1.63 | 1.56 | 2.07 | 1.98 |
| f/f5 | −2.27 | −2.23 | −2.22 | −2.17 | −2.01 | −1.97 | −2.14 | −1.97 |
| f/f4 − f/f1 | 0.71 | 0.84 | 0.78 | 0.51 | 0.17 | 0.12 | 0.91 | 0.77 |
| Yc1/ImgH | 0.70 | 0.68 | 0.68 | 0.70 | 0.71 | 0.72 | 0.64 | 0.65 |
| Yc2/ImgH | 0.73 | 0.71 | 0.71 | 0.72 | 0.73 | 0.75 | 0.66 | 0.68 |
| SL/TTL | 0.86 | 0.87 | 0.88 | 0.97 | 0.97 | 0.97 | 0.88 | 0.77 |
| TTL/ImgH | 1.54 | 1.55 | 1.57 | 1.52 | 1.52 | 1.50 | 1.43 | 1.60 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A photographing optical lens assembly comprising, in order from an object side to an image side:
a first lens element with positive refractive power having a convex object-side surface;
a second lens element with negative refractive power;
a third lens element;
a fourth lens element; and
a fifth lens element having a concave image-side surface and made of plastic material, wherein the fifth lens element has at least one inflection point formed on at least one of the object-side surface and the image-side surface thereof;
wherein a focal length of the photographing optical lens assembly is f, a focal length of the first lens element is f1; the photographing optical lens assembly further comprises an aperture stop and an image sensor, wherein a distance on the optical axis between the aperture stop and the image plane is SL; a distance on the optical axis between the object-side surface of the first lens element and the image plane is TTL, when the incident angle $\theta_1$ of the light is 36 degrees and the light passes through the center of the aperture stop, the vertical distance from the optical axis to the intersection point of the light and the image-side surface of the fifth lens element is Yc1, the image sensor is located on the image plane, a half of a diagonal length of an effective pixel area of the image sensor is ImgH, and they satisfy the following relationships:

$0.7 < f/f1 < 2.0;$ $0.7 < SL/TTL < 1.2;$ and $0.3 < Yc1/ImgH < 0.9.$

2. The photographing optical lens assembly of claim 1, wherein the distance on the optical axis between the object-side surface of the first lens element and the image plane is TTL, the half of a diagonal length of an effective pixel area of the image sensor is ImgH, and they satisfy the following relationship:

$TTL/ImgH < 1.75.$

3. The photographing optical lens assembly of claim 1, wherein the fourth lens element is made of plastic material, and the fourth lens element has a concave object-side surface and a convex object-side surface, and the object-side surface and the image-side surface of the fourth lens element are aspheric.

4. The photographing optical lens assembly of claim 3, wherein the Abbe number of the second lens element is V2, the Abbe number of the third lens element is V3, and they satisfy the following relationship:

$|V2 − V3| < 10.$

5. The photographing optical lens assembly of claim 3, wherein the focal length of the photographing optical lens assembly is f, the focal length of the first lens element is f1, a focal length of the fourth lens element is f4, and they satisfy the following relationship:

$$0.0 < f/f4 \leq f/f1 < 1.5.$$

6. The photographing optical lens assembly of claim 5, wherein a radius of curvature of the object-side surface of the second lens element is R3, the radius of curvature of the image-side surface of the second lens element is R4, and they satisfy the following relationship:

$$-1 < R4/R3 < 0.$$

7. The photographing optical lens assembly of claim 5, wherein the Abbe number of the first lens element is V1, the Abbe number of the second lens element is V2, and they satisfy the following relationship:

$$28 < V1 - V2 < 45.$$

8. The photographing optical lens assembly of claim 7, wherein the radius of curvature of the object-side surface of the fifth lens element is R9, the radius of curvature of the image-side surface of the fifth lens element is R10, and they satisfy the following relationship:

$$0.0 < (R9+R10)/(R9-R10) < 1.0.$$

9. The photographing optical lens assembly of claim 5, wherein a radius of curvature of the object-side surface of the fifth lens element is R9, a radius of curvature of the image-side surface of the fifth lens element is R10, and they satisfy the following relationship:

$$-5 < R10/R9 < 5.$$

10. The photographing optical lens assembly of claim 9, wherein the radius of curvature of the object-side surface of the fifth lens element is R9, the radius of curvature of the image-side surface of the fifth lens element is R10, and they satisfy the following relationship:

$$-1.2 < R10/R9 < 0.$$

11. The photographing optical lens assembly of claim 10, wherein the focal length of the photographing optical lens assembly is f, a focal length of the fifth lens element is f5, and they satisfy the following relationship:

$$-3.2 < f/f5 < -1.6.$$

12. The photographing optical lens assembly of claim 9, wherein the focal length of the photographing optical lens assembly is f, the focal length of the first lens element is f1, and they satisfy the following relationship:

$$1.0 < f/f1 < 1.8.$$

13. The photographing optical lens assembly of claim 12, wherein a radius of curvature of the object-side surface of the first lens element is R1, a radius of curvature of the image-side surface of the first lens element is R2, and they satisfy the following relationship:

$$|R1/R2| < 0.3.$$

14. The photographing optical lens assembly of claim 12, wherein the focal length of the photographing optical lens assembly is f, the focal length of the fourth lens element is f4, and they satisfy the following relationship:

$$1.3 |f/f4| < 2.5.$$

15. The photographing optical lens assembly of claim 14, wherein when the incident angle $\theta_2$ of the light is 37 degrees and the light passes through the center of the aperture stop, the vertical distance from the optical axis to the intersection point of the light and the image-side surface of the fifth lens element is Yc2, the half of a diagonal length of an effective pixel area of the image sensor is ImgH, and they satisfy the following relationship:

$$0.5 < Yc2/ImgH < 0.9.$$

16. A photographing optical lens assembly comprising, in order from an object side to an image side:
   to a first lens element with positive refractive power having a convex object-side surface;
   a second lens element with negative refractive power;
   a third lens element;
   a fourth lens element with positive refractive power, wherein at least one surface of the fourth lens element is aspheric;
   a fifth lens element with negative refractive power having a concave image-side surface, wherein at least one surface of the fifth lens element is aspheric;
   wherein a radius of curvature of the object-side surface of the fifth lens element is R9, a radius of curvature of the image-side surface of the fifth lens element is R10; the photographing optical lens assembly further comprises an aperture stop and an image sensor, wherein a distance on the optical axis between the aperture stop and the image plane is SL, a distance on the optical axis between the object-side surface of the first lens element and the image plane is TTL, when the incident angle $\theta_1$ of the light is 36 degrees and the light passes through the center of the aperture stop, the vertical distance from the optical axis to the intersection point of the light and the image-side surface of the fifth lens element is Yc1, the image sensor is located on the image plane, a half of a diagonal length of an effective pixel area of the image sensor is ImgH, and they satisfy the following relationships:

$$-5 < R10/R9 < 5;$$

$$0.7 < SL/TTL < 1.2;$$

and $$0.3 < Yc1/ImgH < 0.9.$$

17. The photographing optical lens assembly of claim 16, wherein a radius of curvature of the object-side surface of the second lens element is R3, the radius of curvature of the image-side surface of the second lens element is R4, and they satisfy the following relationship:

$$-1 < R4/R3 < 0.$$

18. The photographing optical lens assembly of claim 16, wherein the fourth lens element has a concave object-side surface and a convex image-side surface, and the fifth lens element has a concave object-side surface, wherein fifth lens element has at least one inflection point on at least one of the object-side surface and the image-side surface thereof.

19. The photographing optical lens assembly of claim 18, wherein a radius of curvature of the object-side surface of the first lens element is R1, a radius of curvature of the image-side surface of the first lens element is R2, a focal length of the photographing optical lens assembly is f, a focal length of the fifth lens element is f5, and they satisfy the following relationships:

$$|R1/R2| < 0.3;$$

and $$-3.2 < f/f5 < -1.6.$$

20. The photographing optical lens assembly of claim 18, wherein the focal length of the photographing optical lens assembly is f, a focal length of the first lens element is f1, a focal length of the fourth lens element is f4, and they satisfy the following relationship:

$$0.0 < f/f4 - f/f1 < 1.5.$$

21. The photographing optical lens assembly of claim 18, wherein the focal length of the photographing optical lens assembly is f, the focal length of the fourth lens element is f4, and they satisfy the following relationship:

$$1.3 < f/f4 < 2.5.$$

22. A photographing optical lens assembly comprising, in order from an object side to an image side:
- a first lens element with positive refractive power having a convex object-side surface;
- a second lens element;
- a third lens element;
- a fourth lens element with positive refractive power having a concave object-side surface and a convex image-side surface, wherein at least one surface of the fourth lens element is aspheric;
- a fifth lens element with negative refractive power having a concave image-side surface, wherein the fifth lens element has at least one inflection point formed on at least one of the object-side surface and the image-side surface thereof;
- wherein a maximal field of view of the photographing optical lens assembly is FOV, a radius of curvature of the object-side surface of the fifth lens element is R9, a radius of curvature of the image-side surface of the fifth lens element is R10, and they satisfying the following relationships:

$$FOV > 72;$$

and $$0 < (R9+R10)/(R9-R10) < 1.7.$$

23. The photographing optical lens assembly of claim 22, wherein the Abbe number of the first lens element is V1, the Abbe number of the second lens element is V2, and they satisfy the following relationship:

$$28 < V1 - V2 < 42.$$

24. The photographing optical lens assembly of claim 22, wherein the fifth lens element is made of plastic material, the radius of curvature of the object-side surface of the fifth lens element is R9, the radius of curvature of the image-side surface of the fifth lens element is R10, and they satisfy the following relationship:

$$-1 < R10/R9 < 0.$$

25. The photographing optical lens assembly of claim 24, wherein a focal length of the photographing optical lens assembly is f, a focal length of the fourth lens element is f4, and a focal length of the fifth lens element is f5, and they satisfy the following relationships:

$$-2.8 < f/f5 < -1.6; \text{ and}$$

$$1.3 < f/f4 < 2.5.$$

26. The photographing optical lens assembly of claim 24, wherein the photographing optical lens assembly comprises an aperture stop and an image sensor, when the incident angle $\theta_2$ of the light is 37 degrees and the light passes through the center of the aperture stop, the vertical distance from the optical axis to the intersection point of the light and the image-side surface of the fifth lens element is Yc2, a half of a diagonal length of an effective pixel area of the image sensor is ImgH, and they satisfy the following relationship:

$$0.5 < Yc2/ImgH < 0.9.$$

* * * * *

UNITED STATES PATENT AND TRADEMARK OFFICE
CERTIFICATE OF CORRECTION

| | | |
|---|---|---|
| PATENT NO. | : 8,284,291 B2 | Page 1 of 1 |
| APPLICATION NO. | : 13/050962 | |
| DATED | : October 9, 2012 | |
| INVENTOR(S) | : Hsin-Hsuan Huang and Tsung-Han Tsai | |

It is certified that error appears in the above-identified patent and that said Letters Patent is hereby corrected as shown below:

1. The relationship appearing in column 33, claim 5 should be changed to the relationship as follows:
$0.0 < f/f4 - f/f1 < 1.5$.
2. The relationship appearing in column 33, claim 14 should be changed to the relationship as follows:
$1.3 < f/f4 < 2.5$.
3. In column 32, claim 3 should be changed to the relationship as follows:
...the fourth lens element has a concave object-side surface and a convex image-side surface,... .

Signed and Sealed this
Eighth Day of January, 2013

David J. Kappos
*Director of the United States Patent and Trademark Office*

UNITED STATES PATENT AND TRADEMARK OFFICE
CERTIFICATE OF CORRECTION

PATENT NO.        : 8,284,291 B2
APPLICATION NO.   : 13/050962
DATED             : October 9, 2012
INVENTOR(S)       : Hsin-Hsuan Huang and Tsung-Han Tsai Page 1 of 1

It is certified that error appears in the above-identified patent and that said Letters Patent is hereby corrected as shown below:

1. The relationship appearing in column 33, line 4, claim 5 should be changed to the relationship as follows:
$0.0 < f/f4 - f/f1 < 1.5$.
2. The relationship appearing in column 33, line 62, claim 14 should be changed to the relationship as follows:
$1.3 < f/f4 < 2.5$.
3. In column 32, lines 56-57, claim 3 should be changed to the relationship as follows:
...the fourth lens element has a concave object-side surface and a convex image-side surface,... .

This certificate supersedes the Certificate of Correction issued January 8, 2013.

Signed and Sealed this
Nineteenth Day of February, 2013

Teresa Stanek Rea
*Acting Director of the United States Patent and Trademark Office*